US011252706B2

(12) United States Patent
Fan et al.

(10) Patent No.: US 11,252,706 B2
(45) Date of Patent: Feb. 15, 2022

(54) UPLINK CONTROL CHANNEL CODEBOOK DESIGN IN NEW RADIO UNLICENSED

(71) Applicant: QUALCOMM Incorporated, San Diego, CA (US)

(72) Inventors: Zhifei Fan, San Diego, CA (US); Tao Luo, San Diego, CA (US); Xiaoxia Zhang, San Diego, CA (US); Arumugam Chendamarai Kannan, San Diego, CA (US); Jing Sun, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 16/738,739

(22) Filed: Jan. 9, 2020

(65) Prior Publication Data

US 2020/0229179 A1 Jul. 16, 2020

Related U.S. Application Data

(60) Provisional application No. 62/792,332, filed on Jan. 14, 2019, provisional application No. 62/792,310, filed on Jan. 14, 2019.

(51) Int. Cl.
*H04W 72/04* (2009.01)
*H04W 16/14* (2009.01)

(52) U.S. Cl.
CPC ....... *H04W 72/0413* (2013.01); *H04W 16/14* (2013.01)

(58) Field of Classification Search
CPC .. H04W 16/14; H04W 72/0413; H04L 1/1864
See application file for complete search history.

(56) References Cited

U.S. PATENT DOCUMENTS

2017/0111951 A1 4/2017 Chu et al.
2018/0091272 A1* 3/2018 Wang ................... H04B 7/0626
(Continued)

OTHER PUBLICATIONS

Huawei, et al., "HARQ Enhancements in NR Unlicensed", 3GPP Draft, 3GPP TSG RAN WG1 Ad-Hoc Meeting 1901, R1-1900062, 3rd Generation Partnership Project (3GPP), Mobile Competence Centre, 650, Route Des Lucioles, F-06921, Sophia-Antipolis Cedex, France, vol. RAN WG1, No. Taipei; Jan. 21, 2019-Jan. 25, 2019, Jan. 11, 2019 (Jan. 11, 2019), XP051575688, 11 pages, Retrieved from the Internet:URL: http://www.3gpp.org/ftp/tsg%5Fran/WG1%5FRL1/TSGR1%5FAH/NR%5FAH%5F1901/Docs/R1%2D1900062%2Ezip retrieved on Jan. 11, 2019],pp. 1,3-5.
(Continued)

*Primary Examiner* — Brian D Nguyen
(74) *Attorney, Agent, or Firm* — Liem T. Do

(57) ABSTRACT

Methods, systems, and devices for wireless communications are described. A user equipment (UE) may identify, based at least in part on monitoring a set of channels for signals during a monitoring window, a subset of channels in which signals were detected during the monitoring window. The UE may select, based at least in part on the subset of channels, a format for a first sub-codebook and a second sub-codebook, the second sub-codebook indicating a feedback state for corresponding data transmissions received on the channels within the subset of channels. The UE may transmit the first uplink control message using a first sub-codebook, the first uplink control message identifying the format for the second sub-codebook and identifying the channels within the subset of channels. The UE may transmit a second uplink control message using the second sub-codebook according to the selected format.

28 Claims, 19 Drawing Sheets

(56) References Cited

U.S. PATENT DOCUMENTS

| | | | | |
|---|---|---|---|---|
| 2020/0295810 A1* | 9/2020 | Baldemair | ............ | H04L 1/1822 |
| 2021/0006378 A1* | 1/2021 | Lei | ........................ | H04L 1/1861 |
| 2021/0076405 A1* | 3/2021 | Li | ........................ | H04L 5/0053 |
| 2021/0184790 A1* | 6/2021 | Guan | ........................ | H04L 1/18 |
| 2021/0184805 A1* | 6/2021 | Guan | .................... | H04L 1/1854 |

OTHER PUBLICATIONS

International Search Report and Written Opinion—PCT/US2020/013100—ISA/EPO—dated Jul. 2, 2020.
Partial International Search Report—PCT/US2020/013100—ISA/EPO—dated Apr. 28, 2020.
Vivo: "Discussion on HARQ Operation for NR-U," 3GPP Draft, 3GPP TSG RAN WG1 Ad-Hoc Meeting 1901, R1-1900112—Discussion on HARQ Operation for NR-U, 3rd Generation Partnership Project (3GPP), Mobile Competence Centre, 650, Route Des Lucioles, F-06921, Sophia-Antipolis Cedex, France, vol. RAN WG1, No. Taipei; Jan. 21, 2019-Jan. 25, 2019, Jan. 12, 2019 {Jan. 12, 2019), XP051575737, 6 pages, Retrieved from the Internet:URL: http://www.3gpp.org/ftp/tsg%5Fran/WG1%5FRL1/TSGR1%5FAH/NR%5FAH%5F1901/Docs/R1%2D1900112%2Ezip [retrieved on Jan. 12, 2019], pp. 2-4.

* cited by examiner

UPLINK CONTROL CHANNEL CODEBOOK DESIGN IN NEW RADIO UNLICENSED

CROSS REFERENCE

The present Application for Patent claims the benefit of U.S. Provisional Patent Application No. 62/792,332 by FAN, et al., entitled "UPLINK CONTROL CHANNEL CODEBOOK DESIGN IN NEW RADIO UNLICENSED," filed Jan. 14, 2019, and to U.S. Provisional Application No. 62/792,310 by FAN, et al., entitled "UPLINK CONTROL CHANNEL CODEBOOK DESIGN IN NEW RADIO UNLICENSED" filed Jan. 14, 2019, assigned to the assignee hereof, and expressly incorporated herein.

BACKGROUND

The following relates generally to wireless communications, and more specifically to uplink control channel codebook design in New Radio (NR) unlicensed.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless networks typically utilize feedback reports to indicate whether or not a transmission was received. The feedback report may be hybrid automatic repeat request (HARD) based, utilizing one or more bits to indicate whether a particular transmission was received. Typically and for downlink data transmissions, this may include the base station transmitting a grant (e.g., downlink control information (DCI)) that identifies or otherwise conveys an indication of resources for a corresponding downlink data transmission. The grant may also carry or otherwise convey an indication of a reporting occasion in which the feedback report for the downlink data transmission is to be provided. The UE receives the grant and identifies the resources and reporting occasion for the downlink data transmission, and uses this information to receive the downlink data transmission and provide the feedback report to the base station. Conventionally, the UE utilizes a codebook to configure or otherwise select the format for the feedback report. The format for the feedback report (e.g., based on the codebook design) may change from one reporting occasion to the next, e.g., based on how many downlink data transmissions have been configured for a particular reporting occasion.

SUMMARY

The described techniques relate to improved methods, systems, devices, and apparatuses that support uplink control channel codebook design in New Radio (NR) unlicensed. In some aspects, the feedback reporting may be based on detection of a signal during a monitoring window. For example, the base station may transmit one or more instances of a signal on each channel configured for the UE during a monitoring window. Broadly, the signal may generally refer to any signal that is transmitted by a base station on the one or more channels in a reliable and predictable manner. Examples of the signal may include, but are not limited to, a format indicator channel, a downlink grant, a channel state information reference signal, an uplink grant, and the like. In some aspects, the signal is transmitted during a transmission window. The UE may determine, for each of the monitored channels, whether the signal was received or otherwise detected on the channel(s) and select a format for a first sub-codebook and/or a second sub-codebook based on the determination. The second sub-codebook may indicate a feedback state for downlink data transmissions received on the channel(s) based on whether or not the signal is detected on the channel(s). For example, detection of the signal on the channel may indicate that the channel is performing in a manner sufficient to support wireless communications, which may further signal that downlink data transmissions on the channel are more likely to be detected by the UE. Accordingly, the UE may identify a subset of channels from the one or more channels and select a format for the second sub-codebook based on which channels are included in the subset of channels. The UE may transmit or otherwise provide a first uplink control message using the first sub-codebook that identifies or otherwise indicates the format of the second sub-codebook and/or the channels within the subset of channels. The UE may transmit a second uplink control message using the second sub-codebook according to the selected format. In some aspects, the second uplink control message may carry or otherwise convey an indication of the feedback state for the corresponding downlink data transmissions received on the channels within the subset of channels during the transmission window (e.g., a K-1 window).

Additionally or alternatively, the base station may transmit or otherwise provide an indication of active channel(s) within the one or more channels associated with the transmission window. For example, the base station may monitor the one or more channels associated with the transmission window and determine which channels are active (e.g., which channels are performing in a manner that supports wireless communications). The base station may transmit or otherwise provide an indication of the active channels to UE(s) operating within its coverage area in a broadcast transmission, a unicast transmission, a group based transmission, and the like. Accordingly, the base station may perform downlink transmissions (e.g., downlink data transmissions) to a UE over the active channels and receive an uplink control message during a reporting occasion that carries or conveys feedback information for the corresponding downlink data transmissions. In some aspects, the format of the uplink control message to be based, at least in some aspects, on the indication of the active channels that the UE received from the base station. Accordingly, aspects of the described techniques support the base station and/or UE configuring or otherwise communicating feedback reports (e.g., the uplink control message) that are formatted in a manner corresponding to which channels within the transmission window are active. In some aspects, the base station may additionally provide an indication of the active channels and a starting window of the downlink grant for the downlink data transmissions.

A method of wireless communications at a UE is described. The method may include identifying, based on monitoring a set of channels for signals during a monitoring window, a subset of channels in which signals were detected during the monitoring window, selecting, based on the subset of channels, a format for a first sub-codebook and a second sub-codebook, the second sub-codebook indicating a feedback state for corresponding data transmissions received on the channels within the subset of channels, transmitting the first uplink control message using a first sub-codebook, the first uplink control message identifying the format for the second sub-codebook and identifying the channels within the subset of channels, and transmitting a second uplink control message using the second sub-codebook according to the selected format, the second uplink control message including the feedback state for the corresponding data transmissions received on the channels within the subset of channels during a transmission window.

An apparatus for wireless communications at a UE is described. The apparatus may include a processor, memory in electronic communication with the processor, and instructions stored in the memory. The instructions may be executable by the processor to cause the apparatus to identify, based on monitoring a set of channels for signals during a monitoring window, a subset of channels in which signals were detected during the monitoring window, select, based on the subset of channels, a format for a first sub-codebook and a second sub-codebook, the second sub-codebook indicating a feedback state for corresponding data transmissions received on the channels within the subset of channels, transmit the first uplink control message using a first sub-codebook, the first uplink control message identifying the format for the second sub-codebook and identifying the channels within the subset of channels, and transmit a second uplink control message using the second sub-codebook according to the selected format, the second uplink control message including the feedback state for the corresponding data transmissions received on the channels within the subset of channels during a transmission window.

Another apparatus for wireless communications at a UE is described. The apparatus may include means for identifying, based on monitoring a set of channels for signals during a monitoring window, a subset of channels in which signals were detected during the monitoring window, selecting, based on the subset of channels, a format for a first sub-codebook and a second sub-codebook, the second sub-codebook indicating a feedback state for corresponding data transmissions received on the channels within the subset of channels, transmitting the first uplink control message using a first sub-codebook, the first uplink control message identifying the format for the second sub-codebook and identifying the channels within the subset of channels, and transmitting a second uplink control message using the second sub-codebook according to the selected format, the second uplink control message including the feedback state for the corresponding data transmissions received on the channels within the subset of channels during a transmission window.

A non-transitory computer-readable medium storing code for wireless communications at a UE is described. The code may include instructions executable by a processor to identify, based on monitoring a set of channels for signals during a monitoring window, a subset of channels in which signals were detected during the monitoring window, select, based on the subset of channels, a format for a first sub-codebook and a second sub-codebook, the second sub-codebook indicating a feedback state for corresponding data transmissions received on the channels within the subset of channels, transmit the first uplink control message using a first sub-codebook, the first uplink control message identifying the format for the second sub-codebook and identifying the channels within the subset of channels, and transmit a second uplink control message using the second sub-codebook according to the selected format, the second uplink control message including the feedback state for the corresponding data transmissions received on the channels within the subset of channels during a transmission window.

Some examples of the method, apparatuses, and non-transitory computer-readable medium described herein may further include operations, features, means, or instructions for determining, based on the monitoring, that the channels in the subset of channels satisfy a channel quality metric, where the channels in the subset of channels may be identified based on the determining.

Some examples of the method, apparatuses, and non-transitory computer-readable medium described herein may further include operations, features, means, or instructions for configuring a bitmap of the first uplink control message based on the first sub-codebook to identify the channels within the subset of channels.

Some examples of the method, apparatuses, and non-transitory computer-readable medium described herein may further include operations, features, means, or instructions for indicating, in the first uplink control message and for each channel in the subset of channels, a starting point of a reporting occasion in which the second uplink control message will be transmitted.

Some examples of the method, apparatuses, and non-transitory computer-readable medium described herein may further include operations, features, means, or instructions for indicating, in the first uplink control message and for each channel in the set of channels that may be not included in the subset of channels, a NULL value as a starting point of a reporting occasion in which the second uplink control message will be transmitted.

In some examples of the method, apparatuses, and non-transitory computer-readable medium described herein, the first uplink control message may be transmitted in a clear-to-send transmission occurring prior to a channel occupancy time, and one or more instances of the second uplink control message may be transmitted in a physical uplink control channel transmission occurring within the channel occupancy time.

Some examples of the method, apparatuses, and non-transitory computer-readable medium described herein may further include operations, features, means, or instructions for receiving a confirmation signal confirming receipt of the first uplink control message, where the one or more instances of the second uplink control messages may be transmitted based on the confirmation signal.

In some examples of the method, apparatuses, and non-transitory computer-readable medium described herein, the first uplink control message may be transmitted in a physical uplink control channel transmission occurring during to a channel occupancy time, and one or more instances of the second uplink control message may be transmitted in subsequent physical uplink control channel transmissions occurring within the channel occupancy time.

Some examples of the method, apparatuses, and non-transitory computer-readable medium described herein may further include operations, features, means, or instructions for receiving a confirmation signal confirming receipt of the first uplink control message, where the one or more instances of the second uplink control message may be transmitted based on the confirmation signal.

Some examples of the method, apparatuses, and non-transitory computer-readable medium described herein may further include operations, features, means, or instructions for twoing or more instances of the first uplink control message may be transmitted in physical uplink control channel transmissions occurring within a channel occupancy time, and between each instance of the first uplink control message transmission, one or more instances of the second uplink control message may be transmitted in physical uplink control channel transmissions occurring within the channel occupancy time.

Some examples of the method, apparatuses, and non-transitory computer-readable medium described herein may further include operations, features, means, or instructions for identifying a first spatial configuration used for transmitting the first uplink control message transmission, and selecting a second spatial configuration to use for transmitting the second uplink control message transmission based on the first spatial configuration.

Some examples of the method, apparatuses, and non-transitory computer-readable medium described herein may further include operations, features, means, or instructions for selecting the first spatial configuration as the second spatial configuration based on the second uplink control message transmission occurring within a threshold time period of the first uplink control message transmission.

Some examples of the method, apparatuses, and non-transitory computer-readable medium described herein may further include operations, features, means, or instructions for receiving a signal configuring at least one of the first spatial configuration, the second spatial configuration, or a combination thereof.

A method of wireless communications at a base station is described. The method may include transmitting an indication of one or more active channels of a set of channels in an unlicensed radio frequency spectrum band, the set of channels associated with a transmission window configured for a UE, performing a set of downlink transmissions to the UE over the one or more active channels of the set of channels during the transmission window, and receiving, from the UE, an uplink control message at a reporting occasion associated with the transmission window, the uplink control message including feedback information for the set of downlink transmissions, where a format of the uplink control message is based on the indication of the one or more active channels.

An apparatus for wireless communications at a base station is described. The apparatus may include a processor, memory in electronic communication with the processor, and instructions stored in the memory. The instructions may be executable by the processor to cause the apparatus to transmit an indication of one or more active channels of a set of channels in an unlicensed radio frequency spectrum band, the set of channels associated with a transmission window configured for a UE, perform a set of downlink transmissions to the UE over the one or more active channels of the set of channels during the transmission window, and receive, from the UE, an uplink control message at a reporting occasion associated with the transmission window, the uplink control message including feedback information for the set of downlink transmissions, where a format of the uplink control message is based on the indication of the one or more active channels.

Another apparatus for wireless communications at a base station is described. The apparatus may include means for transmitting an indication of one or more active channels of a set of channels in an unlicensed radio frequency spectrum band, the set of channels associated with a transmission window configured for a UE, performing a set of downlink transmissions to the UE over the one or more active channels of the set of channels during the transmission window, and receiving, from the UE, an uplink control message at a reporting occasion associated with the transmission window, the uplink control message including feedback information for the set of downlink transmissions, where a format of the uplink control message is based on the indication of the one or more active channels.

A non-transitory computer-readable medium storing code for wireless communications at a base station is described. The code may include instructions executable by a processor to transmit an indication of one or more active channels of a set of channels in an unlicensed radio frequency spectrum band, the set of channels associated with a transmission window configured for a UE, perform a set of downlink transmissions to the UE over the one or more active channels of the set of channels during the transmission window, and receive, from the UE, an uplink control message at a reporting occasion associated with the transmission window, the uplink control message including feedback information for the set of downlink transmissions, where a format of the uplink control message is based on the indication of the one or more active channels.

Some examples of the method, apparatuses, and non-transitory computer-readable medium described herein may further include operations, features, means, or instructions for transmitting a signal identifying a starting window for transmission of a grant for one or more of the set of downlink transmissions.

In some examples of the method, apparatuses, and non-transitory computer-readable medium described herein, the signal conveys an index mapping the one or more active channels to the starting window.

In some examples of the method, apparatuses, and non-transitory computer-readable medium described herein, the indication of the one or more active channels may be transmitted in at least one of a broadcast transmission, a group-based transmission, a unicast transmission, or a combination thereof.

In some examples of the method, apparatuses, and non-transitory computer-readable medium described herein, the indication of the one or more active channels may be transmitted in at least one of a periodic transmission, an aperiodic transmission, an as-needed transmission, or a combination thereof.

A method of wireless communications at a UE is described. The method may include receiving an indication of one or more active channels of a set of channels in an unlicensed radio frequency spectrum band, the set of channels associated with a transmission window configured for the UE, receiving a set of downlink transmissions over the one or more active channels of the set of channels during the transmission window, and transmitting an uplink control message at a reporting occasion associated with the transmission window, the uplink control message including feedback information for the set of downlink transmissions, where a format of the uplink control message is based on the indication of the one or more active channels.

An apparatus for wireless communications at a UE is described. The apparatus may include a processor, memory in electronic communication with the processor, and instructions stored in the memory. The instructions may be executable by the processor to cause the apparatus to receive an indication of one or more active channels of a set of channels in an unlicensed radio frequency spectrum band, the set of channels associated with a transmission window configured for the UE, receive a set of downlink transmissions over the one or more active channels of the set of channels during the transmission window, and transmit an uplink control message at a reporting occasion associated with the transmission window, the uplink control message including feedback information for the set of downlink transmissions, where a format of the uplink control message is based on the indication of the one or more active channels.

Another apparatus for wireless communications at a UE is described. The apparatus may include means for receiving an indication of one or more active channels of a set of channels in an unlicensed radio frequency spectrum band, the set of channels associated with a transmission window configured for the UE, receiving a set of downlink transmissions over the one or more active channels of the set of channels during the transmission window, and transmitting an uplink control message at a reporting occasion associated with the transmission window, the uplink control message including feedback information for the set of downlink transmissions, where a format of the uplink control message is based on the indication of the one or more active channels.

A non-transitory computer-readable medium storing code for wireless communications at a UE is described. The code may include instructions executable by a processor to receive an indication of one or more active channels of a set of channels in an unlicensed radio frequency spectrum band, the set of channels associated with a transmission window configured for the UE, receive a set of downlink transmissions over the one or more active channels of the set of channels during the transmission window, and transmit an uplink control message at a reporting occasion associated with the transmission window, the uplink control message including feedback information for the set of downlink transmissions, where a format of the uplink control message is based on the indication of the one or more active channels.

Some examples of the method, apparatuses, and non-transitory computer-readable medium described herein may further include operations, features, means, or instructions for receiving a signal identifying a starting window for transmission of a grant for one or more of the set of downlink transmissions.

In some examples of the method, apparatuses, and non-transitory computer-readable medium described herein, the signal conveys an index mapping the one or more active channels to the starting window.

In some examples of the method, apparatuses, and non-transitory computer-readable medium described herein, the indication of the one or more active channels may be received in at least one of a broadcast transmission, a group-based transmission, a unicast transmission, or a combination thereof.

In some examples of the method, apparatuses, and non-transitory computer-readable medium described herein, the indication of the one or more active channels may be received in at least one of a periodic transmission, an aperiodic transmission, an as-needed transmission, or a combination thereof.

DETAILED DESCRIPTION

Figure 1:
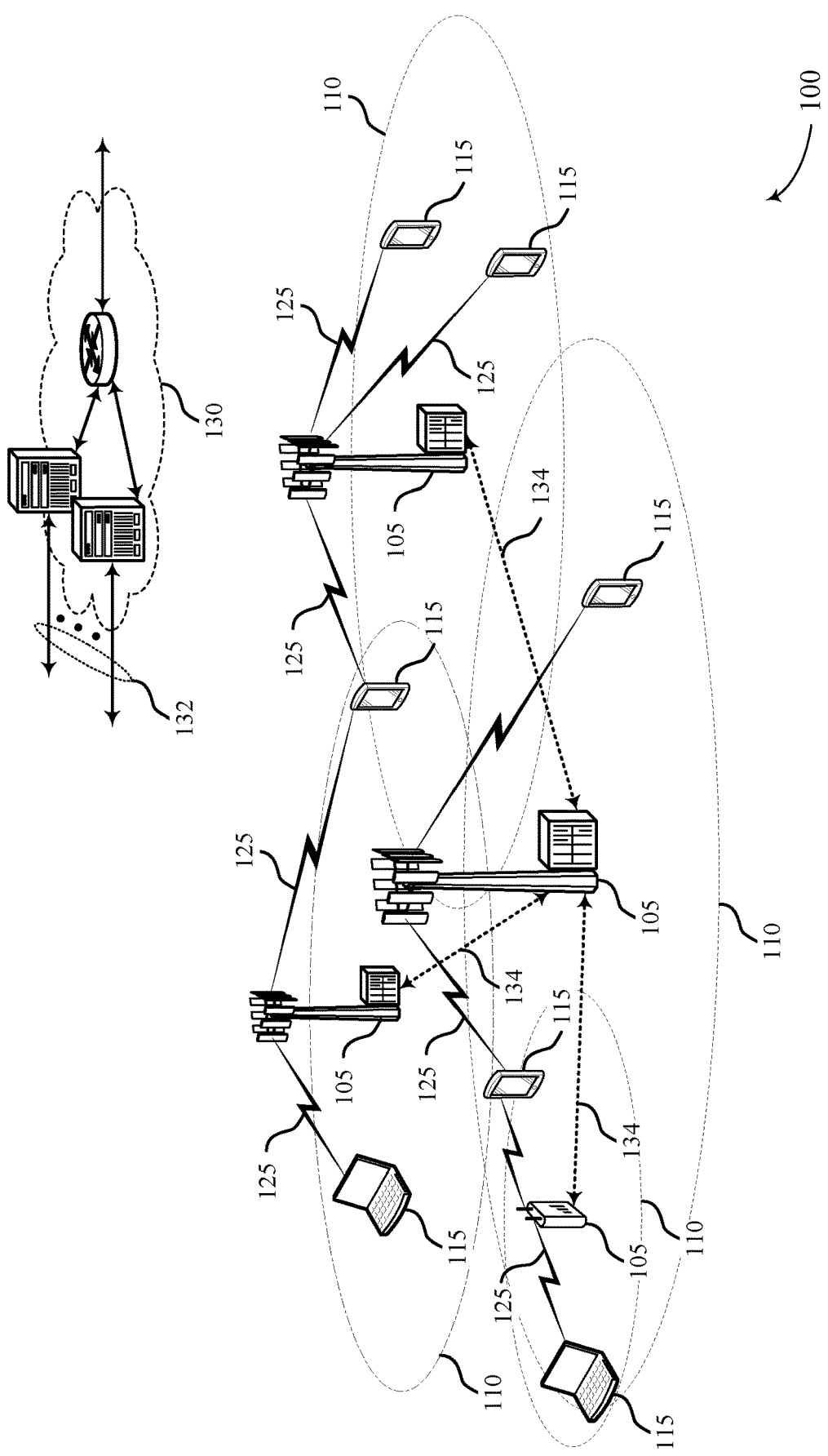
FIG. 1 illustrates an example of a system for wireless communications that supports uplink control channel codebook design in New Radio (NR) unlicensed in accordance with aspects of the present disclosure.

Wireless networks typically utilize feedback reports to indicate whether or not a transmission was received. The feedback report may be hybrid automatic repeat request (HARQ) based, where the feedback report may utilize one or more bits to indicate whether a particular transmission was received. Typically and for downlink data transmissions, this may include the base station transmitting a grant (e.g., downlink control information (DCI)) that identifies or otherwise conveys an indication of resources for a corresponding downlink data transmission. The grant may also carry or otherwise convey an indication of a reporting occasion in which the feedback report for the downlink data transmission is to be provided. The UE receives the grant and identifies the resources and reporting occasion for the downlink data transmission, and uses this information to receive the downlink data transmission and provide the feedback report to the base station. Conventionally, the feedback report carries or conveys acknowledgment/negative-acknowledgment (ACK/NACK) information using one or more bits for each downlink data transmission.

Some wireless networks may support ACK/NACK bundling in the feedback report, e.g., a single feedback report may carry or convey ACK/NACK information for multiple downlink data transmissions received during the same slot and/or during different slots. Conventionally, the UE utilizes a codebook to configure or otherwise select the format for the feedback report. The format for the feedback report (e.g., based on the codebook design) may change from one reporting occasion to the next, e.g., based on how many downlink data transmissions have been configured for a particular reporting occasion. Accordingly, the base station may know or expect the format of the feedback report from the UE based on the downlink data transmissions to the UE. When the wireless network operates in a licensed radio frequency spectrum band, the base station and the UE are able to coordinate such that channel access (and the corresponding downlink data transmissions) are scheduled, resulting in the format for the feedback report being reliable. However, when the wireless network is operating in an unlicensed or shared radio frequency spectrum band, conventional techniques may be inadequate due to the requirement that a listen-before-talk (LBT) procedure must be performed on the channel before access. For example, the base station may be unsuccessful in its LBT procedure, which the UE is unaware of. In this instance, the UE may not know that a downlink grant was never received, which may result in the UE transmitting or otherwise providing a feedback report to the base station having a format that is inconsistent with what the base station expects. This may disrupt the HARQ process and interfere with wireless communications between the base station and the UE.

Aspects of the disclosure are initially described in the context of a wireless communication system. Broadly, aspects of the described techniques may support a signal transmitted by a base station during a monitoring window that the UE uses to determine which channels (e.g., a subset of channels) within channels configured for a transmission window are performing in a manner that supports wireless communications. For example, the base station may transmit signals on a set of channels associated with the transmission window (e.g., a K-1 window) during the monitoring window. The UE may monitor the channels for the signals, and identify a subset of channels based on whether the signals were detected during the monitoring window. For example, the UE may add or otherwise select channels to be included in the subset of channels when the UE detects the signals on those channels. Accordingly, the UE may know which channels within the transmission window are active, which the UE may use to select formats for a first sub-codebook and/or a second-sub-codebook. Broadly, the first sub-codebook may be used to carry or otherwise convey an indication of a format of the second sub-codebook and/or an indication of which channels were detected during the monitoring window. The second sub-codebook may generally be used or otherwise convey an indication of the feedback state for data transmissions received on the channels within the subset of channels during the transmission window.

Additionally or alternatively, the base station may inform the UE of which channels are active within the set of channels configured for the transmission window. For example, the base station may monitor wireless communications performed on the channels within the set of channels configured for the transmission window and determine which channels are performing in an acceptable manner. The base station may determine that channel(s) performing in an acceptable manner are active, and therefore transmit or otherwise provide an indication of the active channels to UEs operating within its coverage area. The UEs may use the indication of the active channels format for a feedback report (e.g., an uplink control message) transmitted during a reporting occasion associated with the transmission window. Generally, the feedback report may carry or otherwise convey an indication of feedback information for the downlink transmissions (e.g., feedback state for the downlink data transmissions received during the transmission window).

Aspects of the disclosure are further illustrated by and described with reference to apparatus diagrams, system diagrams, and flowcharts that relate to uplink control channel codebook design in New Radio (NR) unlicensed.

FIG. 1 illustrates an example of a wireless communication system 100 that supports uplink control channel codebook design in NR unlicensed in accordance with aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a NR network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may identify, based at least in part on monitoring a set of channels for signals during a monitoring window, a subset of channels in which signals were detected during the monitoring window. The UE 115 may select, based at least in part on the subset of channels, a format for a first sub-codebook and a second sub-codebook, the second sub-codebook indicating a feedback state for corresponding data transmissions received on the channels within the subset of channels. The UE 115 may transmit the first uplink control message using a first sub-codebook, the first uplink control message identifying the format for the second sub-codebook and identifying the channels within the subset of channels. The UE 115 may transmit a second uplink control message using the second sub-codebook according to the selected format, the second uplink control message comprising the feedback state for the corresponding data transmissions received on the channels within the subset of channels during a transmission window.

In some aspects, a base station 105 may transmit an indication of one or more active channels of a plurality of channels in an unlicensed radio frequency spectrum band, the plurality of channels associated with a transmission window configured for a UE 115. The base station 105 may perform a plurality of downlink transmissions to the UE 115 over the one or more active channels of the plurality of channels during the transmission window. The base station 105 may receive, from the UE 115, an uplink control message at a reporting occasion associated with the transmission window, the uplink control message comprising feedback information for the plurality of downlink transmissions, wherein a format of the uplink control message is based at least in part on the indication of the one or more active channels.

In some aspects, a UE 115 may receive an indication of one or more active channels of a plurality of channels in an unlicensed radio frequency spectrum band, the plurality of channels associated with a transmission window configured for the UE 115. The UE 115 may receive a plurality of downlink transmissions over the one or more active channels of the plurality of channels during the transmission window. The UE 115 may transmit an uplink control message at a reporting occasion associated with the transmission window, the uplink control message comprising feedback information for the plurality of downlink transmissions, wherein a format of the uplink control message is based at least in part on the indication of the one or more active channels.

Figure 2:
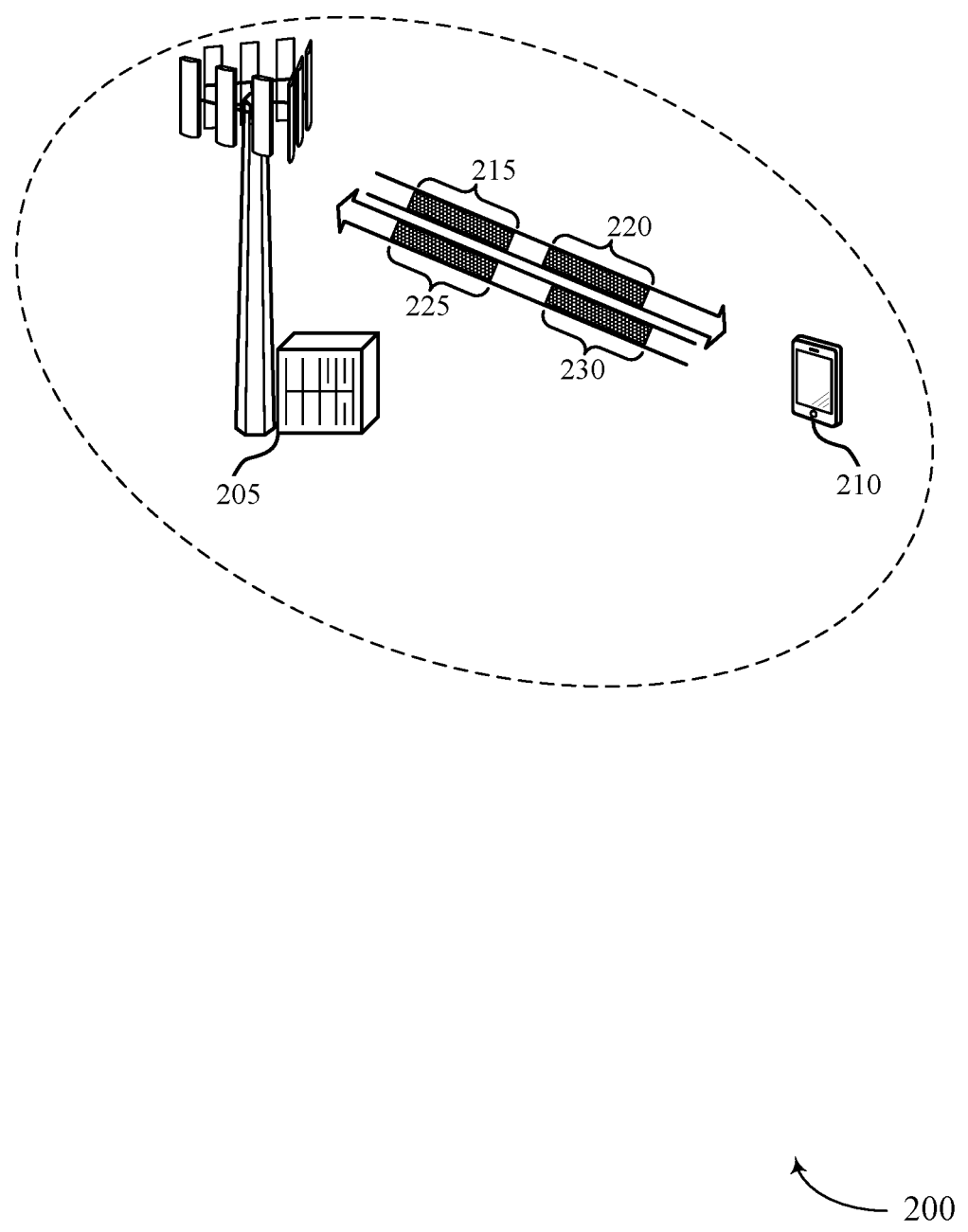
FIG. 2 illustrates an example of a wireless communication system that supports uplink control channel codebook design in NR unlicensed in accordance with aspects of the present disclosure.

FIG. 2 illustrates an example of a wireless communication system 200 that supports uplink control channel codebook design in NR unlicensed in accordance with aspects of the present disclosure. In some examples, wireless communication system 200 may implement aspects of wireless communication system 100. Aspects of wireless communication system 200 may be implemented by base station 205 and/or UE 210, which may be examples of the corresponding devices described herein. In some aspects, wireless communication system 200 may operate in an unlicensed or shared radio frequency spectrum band.

Wireless networks typically support use of the codebook to construct ACK/NACK information in a feedback report during a reporting occasion. The codebook design may include a type 1 codebook used for semi-statically configured downlink data transmissions or a type 2 codebook used for dynamically configured downlink data transmissions. Broadly, the codebook design is used by UE 210 to configure the format for the feedback report. Generally, the format may include one or more bits corresponding to each downlink data transmission being reported in the feedback report. Typically, UE 210 would construct the codebook based upon candidate downlink data transmissions (e.g., PDSCH transmissions) expected within a window, such as a K-1 window (which also may be referred to as a sliding transmission window) that is configured semi-statically. In some aspects, a semi-persistent schedule (SPS) PDSCH reception, which is RRC configured and DCI activated, may be considered or otherwise counted as one PDSCH candidate within the transmission window.

Conventionally, UE 210 may identify, determine, or otherwise derive valid PDSCH candidates within a particular transmission window based on a set of K-1 values, e.g., based on a configured PUCCH slot plus the set of K-1 values. For a serving cell that configures code block group (CBG) based HARQ feedback, HARQ-ACKs for potential PDSCH candidate are padded to have the same size (e.g., an RRC configured parameter associated with the maximum number of CBGs in a transport block (TB)). The size may be different across different component carriers (CCs), bandwidth parts (BWPs), and the like, which may generally be referred to as CC/DL-BWP. The base station (e.g., base station 205) may poll a specific HARQ process only when the HARQ codebook is multiplexed with PUSCH, e.g., the signaling may utilize a special downlink assignment index (DAI) bit in the uplink DCI to indicate such a combination.

Such conventional codebook design techniques are typically utilized in a licensed radio frequency spectrum band. For example, a type 1 codebook (e.g., semi-static) may be defined for PUCCH (e.g., an uplink reporting occasion) to encode ACK/NACK for the active CC/DL-BWP. However, such techniques may be insufficient or otherwise disrupt wireless communications when operating in an unlicensed or shared radio frequency spectrum band. In that context, transmissions may be subject to LBT procedures, which may not always be successful. For example, the base station (e.g., base station 205) may check out the CC (e.g., have a successful LBT procedure) or fail to check out the CC (e.g., have an unsuccessful LBT procedure), which UE 210 is not aware of ahead of time. Such conventional codebook designs may be considered conservative, with no ambiguity, but may waste a lot of bits due to LBT uncertainty of the CC/DL-BWP. Accordingly, aspects of the described techniques provide proposals for modifying a type 1 codebook design for PUCCH in an NR unlicensed radio frequency spectrum band.

Broadly, aspects of the described techniques may include UE 210 constructing a type 1 codebook based on the active CC(s)/DL-BWP(s). In some aspects, the described techniques may include a type 1 codebook being constructed based on the detection of a signal in a monitoring window on the CC(s)/DL-BWP(s) (e.g., the set of channels configured for the K-1 window, or sliding transmission window). In some aspects, the signal detected by UE 210 could be considered an initial signal, which may include a reference signal, a synchronization signal, a downlink grant, an uplink grant, and the like. Broadly, the signal may include any signal being used for wireless communications on the monitored channels, which signals to the UE 210 that the channels are performing in a manner that supports wireless communications. Accordingly, the UE 210 may identify which channels in the set of channels in the K-1 window are available, and construct the codebooks to be communicated to the base station 205 based on the active channels. The first sub-codebook may generally be configured or otherwise selected to carry or convey an indication of a payload size (e.g., the format) of the second sub-codebook. In some aspects, the first sub-codebook may additionally or alternatively carry or convey an indication of which channels that the UE 210 detected the signal on during the monitoring window. For example, the first sub-codebook may include a bitmap of the channels in which the signal was detected (e.g., a subset of channels within a set of channels configured for the K-1 window) to indicate which channels the UE 210 detected the signal. In some aspects, the second sub-codebook may be configured or otherwise selected to carry or convey an indication of a feedback state for downlink data transmissions received on the channels in which the signal was detected and during a transmission window. The UE 210 may transmit a first uplink control message (e.g., PUCCH) to the base station 205 using the first sub-codebook to inform the base station 205 of a format (e.g., the payload size) of the second sub-codebook and then transmit a second uplink control message (e.g., PUCCH) using the second sub-codebook.

Accordingly, base station 205 may configure UE 210 with the transmission window (e.g., a K-1 window) that includes a plurality of downlink data transmission occasions (e.g., candidate PDSCH(s)). Base station 205 may utilize higher layer signaling to configure the transmission window, such as RRC signaling, MAC CE, and the like. Broadly, the transmission window may cover a plurality of occasions (e.g., symbols, mini-slots, slots, and the like). In some aspects, the transmission window may be considered sliding in that it moves in the time domain, e.g., new slots are continually being added while old slots are dropped out of the transmission window. Generally, an occasion may refer to a symbol, a mini-slot, a slot, etc., occurring within the transmission window. Accordingly, a transmission window configured for UE 210 may include or otherwise span a plurality of downlink data transmission occasions. In some aspects, each downlink data transmission occasion may include an occasion (e.g., slot) in which downlink data (e.g., PDSCH) may be scheduled.

Moreover, base station 205 may configure the transmission window to use a set of channels (e.g., the configured CC(s)/DL-BWP(s)). Some of the channels may be CBG configured channels or non-CBG configured channels. The base station 205 may configure the set of channels to use for downlink data transmissions to UE 210 during the transmission window. However, in an unlicensed or shared radio frequency spectrum band, one or more of the channels configured for the transmission window may be unavailable. For example, base station 205 may be unable to capture the channel during an LBT procedure in order to perform a downlink transmission during a downlink transmission occasion. Therefore, not every channel in the set of channels may necessarily be available during the transmission window.

Accordingly, base station 205 may transmit one or more signals on each channel in the set of channels during the monitoring window. In some aspects, the monitoring window may be outside of the transmission window (e.g., beforehand), during the transmission window, and in some examples, during a particular PDSCH occasion. UE 210 may monitor the set of channels for signals during the monitoring window. Based on the monitoring, UE 210 may identify a subset of channels in which the signals were detected during the monitoring window. In some aspects, channels may be added to the subset of channels based on the UE 210 detecting the signal on the channel. In other aspects, UE 210 may only add channels to the subset of channels based on a determination of whether the channel satisfies a channel quality metric. For example, UE 210 may detect a signal on the channel and determine the channel quality indicator (CQI), a receive power level, interference level, etc., on the channel. UE 210 may compare the determined performance metric of the channel to a channel quality metric and add channels to the subset of channels that meet or exceed the channel quality metric.

UE 210 may select a format for the first sub-codebook and/or the second sub-codebook based at least in part on the channels in the subset of channels. For example, UE 210 may determine that the channels in the subset of channels are suitable for performing wireless communications, and therefore this may indicate that downlink data transmissions during the transmission window are more likely than not to be successfully communicated. Accordingly, UE 210 may know that, based on the channels in the subset of channels and the candidate PDSCH occasions associated with the transmission window, that a feedback report indicating the feedback state for the corresponding downlink data transmissions may use a certain format (e.g., may have a payload size that is based at least in part on how many/what type of downlink data transmissions are being reported on). Accordingly, UE 210 may select the format for the second sub-codebook, which then UE 210 uses to select the format for the first sub-codebook. For example, the first sub-codebook may be used to carry or convey an indication of the format of the second sub-codebook and, in some examples identify the channels within the subset of channels. UE 210 may transmit (and base station 205 may receive) a first uplink control message (e.g., PUCCH) using the first sub-codebook and transmit a second uplink control message using the second sub-codebook.

Accordingly, UE 210 may identify the active channels within the set of channels configured for the transmission window by monitoring for signals. UE 210 may determine that the active channels may support downlink data transmissions during the transmission window and configure a format for a feedback report (e.g., based on the second sub-codebook), and then select a format for the first sub-codebook to inform base station 205 of which channels are the active channels and/or what the format of the feedback report will be. This may reduce confusion when operating in an unlicensed or shared radio frequency spectrum band and improve the HARQ process.

As discussed, some aspects of the described techniques may also support base station 205 signaling which channels are the active channels within the transmission window. For example, base station 205 may transmit one or more broadcast and/or unicast signals indicating the active channels (e.g., CC(s)/DL-BWP(s)) to UEs operating within its coverage area, such as UE 210. Base station 205 may send this signal periodically (e.g., to increase the reliability) and/or as needed (e.g., on-demand). In transmitting the signal in a unicast transmission, base station 205 may send it on a per-UE basis in each of the grants, since base station 205 can configure different UEs with different CC(s)/DL-BWP(s).

In some aspects, base station 205 may transmit the signal identifying the active channels and also identifying a starting window of a downlink grant. In some aspects, this may be supported when base station 205 requests UE 210 to provide feedback report only for downlink transmissions occurring within the same channel occupancy time. In some aspects, base station 205 may save overhead in the signal by using higher layer to configure a table for combinations of the active channels (e.g., CC(s)/DL-BWP(s)) and starting window. In this example, base station 205 may transmit an index of that table to UE 210 along with the indication of the active channels.

Accordingly, base station 205 may transmit an indication of one or more active channels of a plurality of channels in an unlicensed radio frequency spectrum band, where the plurality of channels are associated with the transmission window configured for UE 210. Base station 205 may perform downlink transmissions to UE 210 over the active channels of the plurality of channels during the transmission window. UE 210 may transmit an uplink control message (e.g., a feedback report) during a reporting occasion. In some aspects, the uplink control message may carry or convey feedback information for the downlink transmissions received during the transmission window and on the indicated active channels. In some aspects, the format of the uplink control message is based at least in part on which channels are the active channels. That is, UE 210 may select a format for the uplink control message (e.g., the feedback report constructed using a format similar to the second sub codebook discussed above) based on which channels associated with the transmission window are active.

In some aspects, the first sub-codebook (e.g., the first uplink control message configured using the first sub-codebook) may carry or otherwise convey an indication of a bitmap of the channels (e.g., CC(s)/DL-BWP(s)) on which the UE detects the signals during the monitoring period, e.g., may identify the channels in the subset of channels. In some aspects and for each active channel in the subset of channels, the starting point of a window where UE 210 begins to report ACK/NACK information (e.g., the reporting occasion in which the second uplink control message is transmitted) may also be indicated in the first sub-codebook. In some aspects, the starting point of the window may be less than the maximum K1 value configured for the transmission window. In some aspects, the ending point of the window may use the minimum K1 value configured for the transmission window. In some aspects, this may mean that if the UE 210 does not act in the downlink grant and the channel, the UE 210 could indicate the channel is inactive. In some aspects and to make the payload size fixed, for each inactive channel, the UE 210 may report a NULL value (e.g., all zeros) as a starting point of the window. In some aspects and to save overhead, the higher layer may configure a set of the starting points of the window, where the UE 210 reports an index to the set. For example, a starting window set may be 16, 8, 4. If the UE 210 only detects downlink grants starting window from 7, the UE 210 may report the appropriate index to indicate the starting window position is 8. In some aspects, the second sub-codebook may be constructed according to a type 1 codebook in NR-licensed for those detected channels starting from the indicated starting point.

Figure 3:
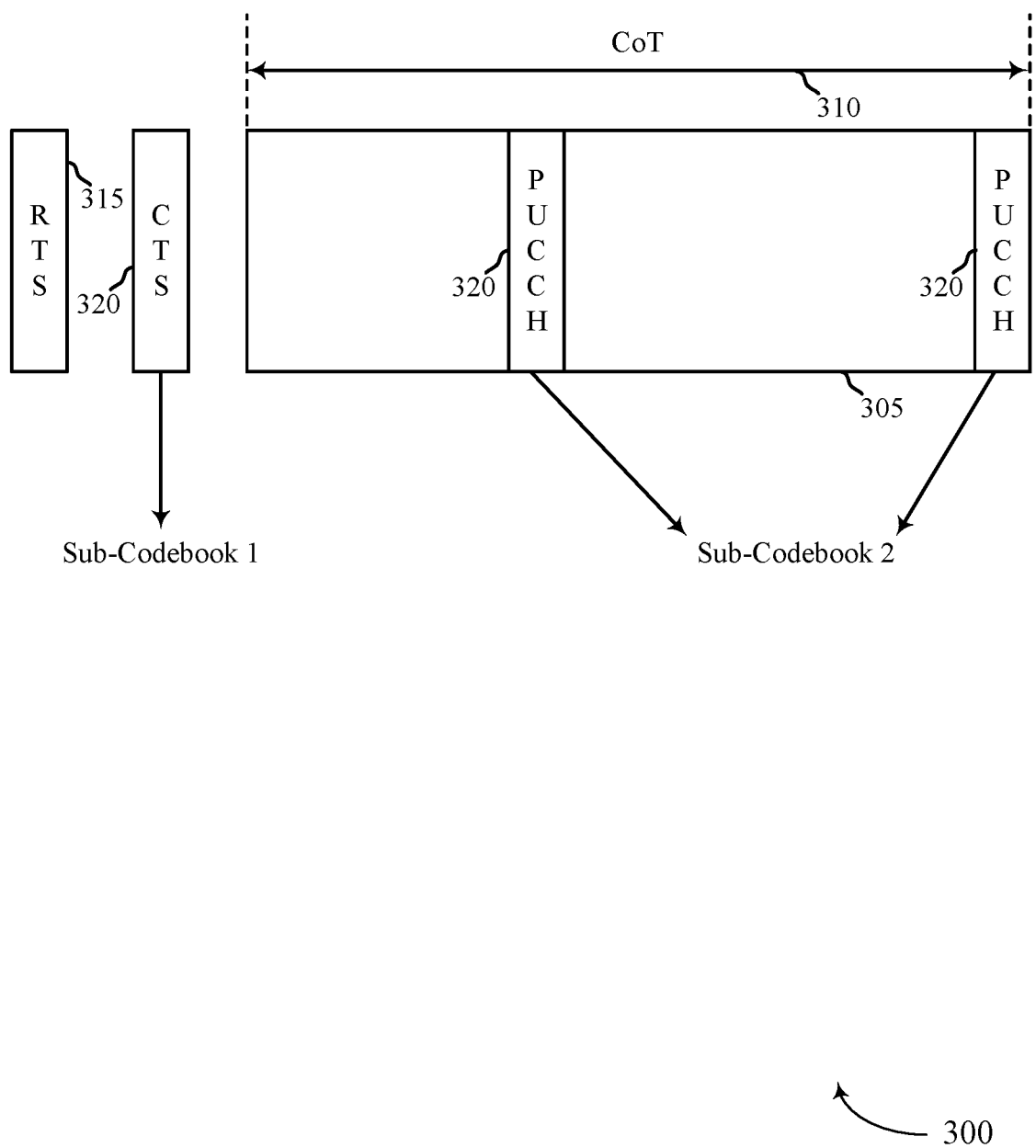
FIG. 3 illustrates an example of a codebook transmission configuration that supports uplink control channel codebook design in NR unlicensed in accordance with aspects of the present disclosure.

FIG. 3 illustrates an example of a codebook transmission configuration 300 that supports uplink control channel codebook design in NR unlicensed in accordance with aspects of the present disclosure. In some examples, codebook transmission configuration 300 may implement aspects of wireless communication systems 100 and/or 200. Aspects of codebook transmission configuration 300 may be implemented by a base station and/or UE, which may be examples of corresponding devices described herein. Generally, codebook transmission configuration 300 illustrates one example of how and/or where the first sub-codebook and/or the second sub-codebook may be communicated from a UE to a base station.

As discussed above, the UE may monitor a set of channels associated with the transmission window during a monitoring window. The UE may identify a subset of channels in which signals are detected during the monitoring window. The UE may select the format for a first sub-codebook and/or the second sub-codebook based at least in part on the channels in the subset of channels. That is, the UE would select a format (e.g., a payload size) for a feedback report (e.g., using the second sub-codebook) based on which channels will be reported in the feedback report. The UE would add one or more bits in the feedback report using the second sub-codebook for candidate PDSCH occasions that are associated with channels in which the signal was detected on the channel during the monitoring window. The UE may use the first sub-codebook to inform the base station of the size and/or format of the second sub-codebook and/or to identify the channels within the subset of channels. The UE may use a second sub-codebook to provide the feedback state for the corresponding downlink data transmissions received during the transmission window (e.g., the feedback report). It is to be understood that codebook transmission configuration 300 illustrates one, non-limiting example of how the first sub-codebook and the second sub-codebook are transmitted to the base station on channel 305, but that the described techniques are not limited to a single channel 305.

For example, channel 305 may include a channel within the plurality of channels configured for the transmission window. Channel 305 may have a corresponding channel occupancy time 310 in which wireless communications are performed on the channel. Generally, the duration of the channel occupancy time 310 may be based at least in part on the LBT procedure performed by the base station. In some aspects, channel 305 may be an unlicensed or shared radio frequency spectrum band channel that utilizes a request to send (RTS)/clear to send (CTS) exchange during the channel access procedure. Broadly, the RTS/CTS exchange may include the base station transmitting an RTS message 315 that includes a request for access to the channel and, in some aspects, may include an indication of a duration of the channel occupancy time 310 and/or an indication of an amount of data to be communicated during the channel occupancy time 310.

The UE may receive the RTS message 315 and respond by transmitting a CTS message 320. Generally, the CTS message may carry or convey an indication that the base station is free or cleared to use the channel. In some aspects, the UE may use the CTS message 320 to transmit the first uplink control message using the first sub codebook. That is, the UE may use the CTS message 320 to carry or convey information identifying the format for the second sub-codebook and/or identifying the channels within the subset of channels. During the channel occupancy time 310, various uplink and/or downlink communications may be performed between the base station and the UE. At least some of those communications may include the UE transmitting one or more instances of an uplink control message (e.g., PUCCH 320). In some aspects, the UE may configure the PUCCH 320 as the second uplink control message using the second sub-codebook. That is, the UE may use the selected format of the second sub-codebook to carry or convey an indication of a feedback state of the corresponding data transmissions received on the channels within the subset of channels during the transmission window. Within this context, the transmission window would be considered a channel occupancy time 310. In some aspects, this may include sending one instance of the first sub-codebook since there is no ambiguity between the base station and the UE.

Figure 4:
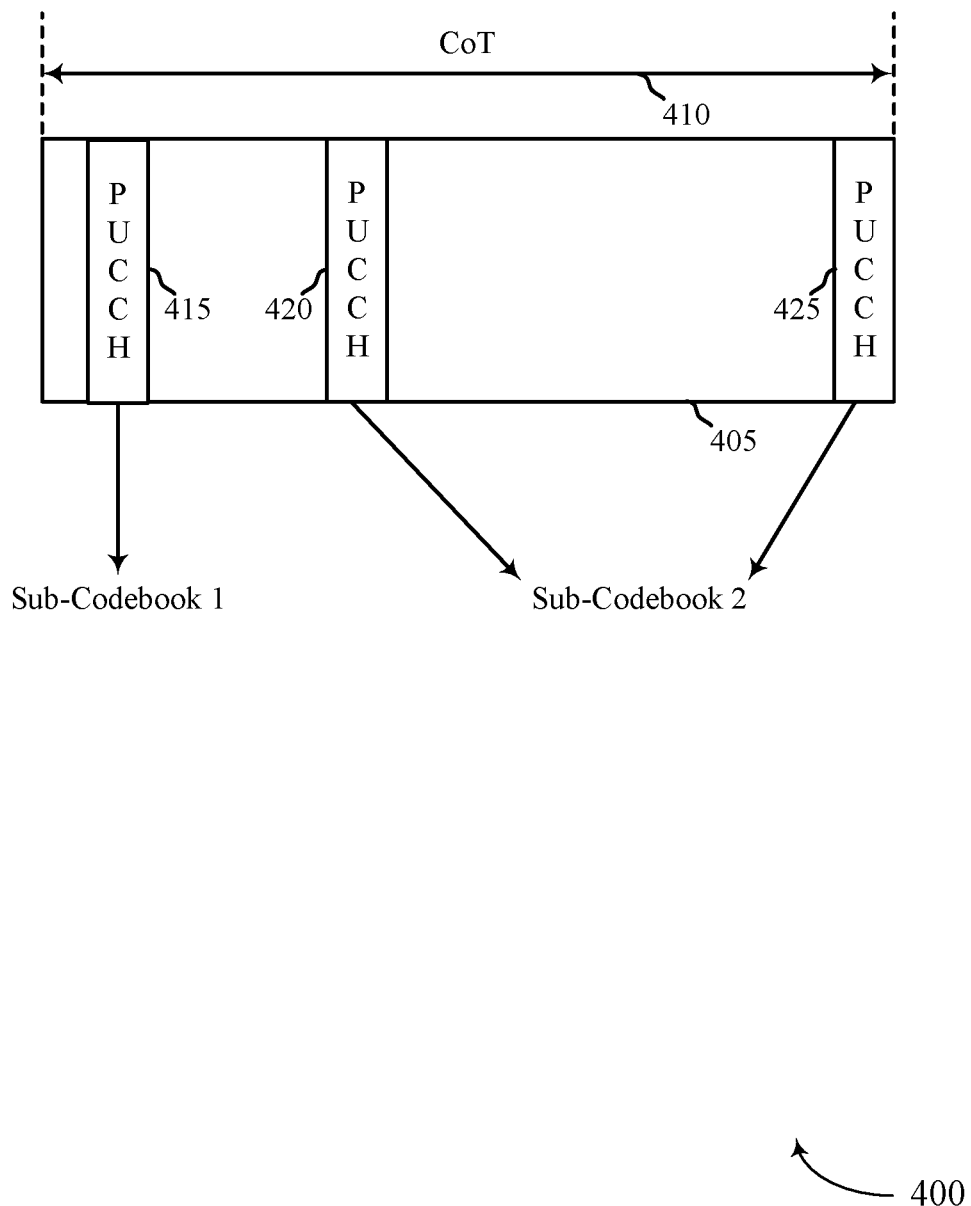
FIG. 4 illustrates an example of a codebook transmission configuration that supports uplink control channel codebook design in NR unlicensed in accordance with aspects of the present disclosure.

FIG. 4 illustrates an example of a codebook transmission configuration 400 that supports uplink control channel codebook design in NR unlicensed in accordance with aspects of the present disclosure. In some examples, codebook transmission configuration 400 may implement aspects of wireless communication systems 100 and/or 200. Aspects of codebook transmission configuration 400 may be implemented by a base station and/or UE, which may be examples of corresponding devices described herein. Generally, codebook transmission configuration 400 illustrates one example of how and/or where the first sub-codebook and/or the second sub-codebook may be communicated from a UE to a base station.

As discussed above, the UE may monitor a set of channels associated with the transmission window during a monitoring window. The UE may identify a subset of channels in which signals are detected during the monitoring window. The UE may select the format for a first sub-codebook and/or the second sub-codebook based at least in part on the channels in the subset of channels. That is, the UE would select a format (e.g., a payload size) for a feedback report (e.g., using the second sub-codebook) based on which channels will be reported in the feedback report. The UE would add one or more bits in the feedback report using the second sub-codebook for candidate PDSCH occasions that are associated with channels in which the signal was detected on the channel during the monitoring window. The UE may use the first sub-codebook to inform the base station of the size and/or format of the second sub-codebook and/or identify the channels within the subset of channels. The UE may use a second sub-codebook to provide the feedback state for the corresponding downlink data transmissions received during the transmission window (e.g., the feedback report). It is to be understood that codebook transmission configuration 400 illustrates one, non-limiting example of how the first sub-codebook and the second sub-codebook are transmitted to the base station on channel 405, but that the described techniques are not limited to a single channel 405.

For example, channel 405 may include a channel within the plurality of channels configured for the transmission window. Channel 405 may have a corresponding channel occupancy time 410 in which wireless communications are performed of the channel. Generally, the duration of the channel occupancy time 410 may be based at least in part on the LBT procedure performed by the base station. In some aspects, channel 405 may be an unlicensed or shared radio frequency spectrum band channel.

Generally, the base station may secure the channel 405 during a channel occupancy time 410. In this context, the channel occupancy time 410 may be considered a transmission window. Accordingly, the channel 405 may be one of the channels within the subset of channels in which the UE detected the signals on during the monitoring window. The base station and/or UE may utilize the channel 405 during the channel occupancy time 410 to perform various wireless communications. The UE may transmit the first uplink control message in PUCCH 415 using the first sub-codebook that identifies or otherwise indicates the format for the second sub-codebook and/or identifies the channels within the subset of channels. The UE may transmit one or more instances of the second uplink control message in PUCCH 420 and/or PUCCH 425. Again, the second uplink control message may use the second sub-codebook according to the selected format to provide an indication of the feedback state of the corresponding data transmissions received on the channels (e.g., such as channel 405) within the subset of channels during the transmission window.

In some aspects, the base station may confirm reception of the first sub-codebook (e.g., the first uplink control message using the first sub-codebook) before the UE sends the second sub-codebook to the base station. In other aspects, there may be no base station confirmation of receipt of the first sub-codebook. In this aspect, a scheme may be developed to guarantee or otherwise improve reliability of receipt of the first uplink control message transmitted using the first sub-codebook.

Figure 5:
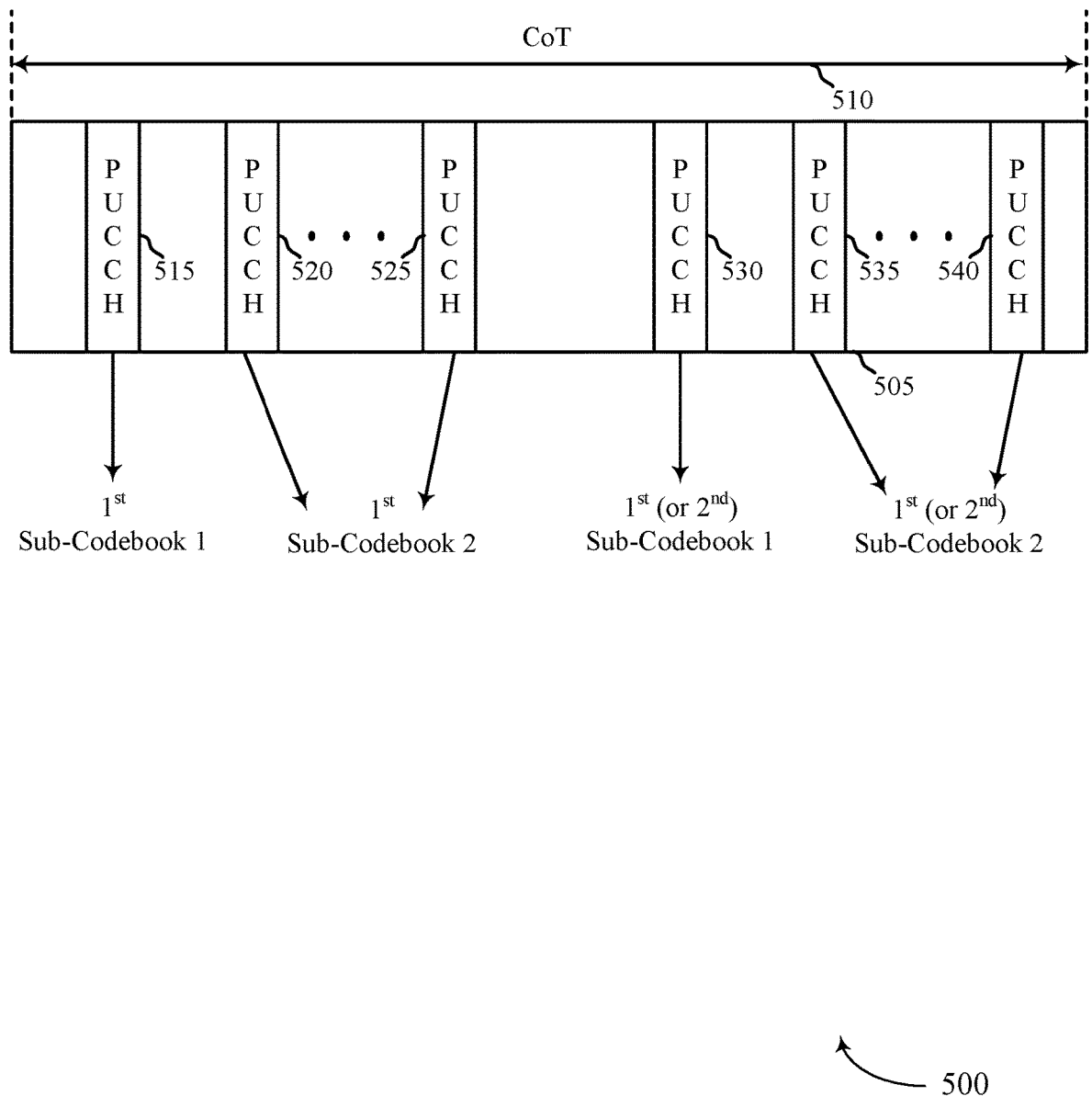
FIG. 5 illustrates an example of a codebook transmission configuration that supports uplink control channel codebook design in NR unlicensed in accordance with aspects of the present disclosure.

FIG. 5 illustrates an example of a codebook transmission configuration 500 that supports uplink control channel codebook design in NR unlicensed in accordance with aspects of the present disclosure. In some examples, codebook transmission configuration 500 may implement aspects of wireless communication systems 100 and/or 200. Aspects of codebook transmission configuration 500 may be implemented by a base station and/or UE, which may be examples of corresponding devices described herein. Generally, codebook transmission configuration 500 illustrates one example of how and/or where the first sub-codebook and/or the second sub-codebook may be communicated from a UE to a base station.

As discussed above, the UE may monitor a set of channels associated with the transmission window during a monitoring window. The UE may identify a subset of channels in which signals are detected during the monitoring window. The UE may select the format for a first sub-codebook and/or the second sub-codebook based at least in part on the channels in the subset of channels. That is, the UE would select a format (e.g., a payload size) for a feedback report (e.g., using the second sub-codebook) based on which channels will be reported in the feedback report. The UE would add one or more bits in the feedback report using the second sub-codebook for candidate PDSCH occasions that are associated with channels in which the signal was detected on the channel during the monitoring window. The UE may use the first sub-codebook to inform the base station of the size and/or format of the second sub-codebook and/or identify the channels within the subset of channels. The UE may use a second sub-codebook to provide the feedback state for the corresponding downlink data transmissions received during the transmission window (e.g., the feedback report). It is to be understood that codebook transmission configuration 500 illustrates one, non-limiting example of how the first sub-codebook and the second sub-codebook are transmitted to the base station on channel 505, but that the described techniques are not limited to a single channel 505.

For example, channel 505 may include a channel within the plurality of channels configured for the transmission window. Channel 505 may have a corresponding channel occupancy time 510 in which wireless communications are performed on the channel. Generally, the duration of the channel occupancy time 510 may be based at least in part on the LBT procedure performed by the base station. In some aspects, channel 505 may be an unlicensed or shared radio frequency spectrum band channel that spans the channel occupancy time 510.

In some aspects, the UE may identify channel 505 as a channel within the subset of channels based on the UE detecting a signal over channel 505 during the monitoring window. In some aspects, channel 505 is associated with the reporting occasion used to transmit a feedback report (e.g., the second uplink control message) to the base station.

Broadly, codebook transmission configuration 500 may include one sub-codebook one being transmitted (e.g., the first uplink control message using the first sub-codebook), followed by one or more instances of the second sub-codebook (e.g., a second uplink control message using the second sub-codebook). For example, the UE may transmit the first sub-codebook in PUCCH 515 and one or more instances of the second codebook in PUCCH 520 and/or 525. The UE may optionally transmit a second instance of the first sub-codebook and/or a second first sub-codebook in PUCCH 530, followed by one or more instances of the second sub-codebook (corresponding to the second first sub-codebook) in PUCCH 535 and/or 540. That is, the UE may be allowed to report different active channels (e.g., CC(s)/DL-BWP(s)) in different first sub-codebooks in the same channel occupancy time 510. In some aspects, the base station may stop one or more of the channels early if there is not enough data being communicated.

In some aspects, the base station may configure the spatial relationship information of PUCCH resources. The UE may follow the NR-licensed rule to choose PUCCH resources in spatial relation configuration information. One exception may include, if the first sub-codebook is next to the second sub-codebook in the time domain, the UE could use spatial relation information of the first sub-codebook or a default spatial relation information to transmit the second sub-codebook. The base station may receive the second sub-codebook with the same or default spatial relation information. For example, the UE may identify a first spatial configuration (e.g., spatial relation information) to use for transmitting the first uplink control message and select a second spatial configuration to use for transmitting the second uplink control message based at least in part on the first spatial relationship. For example, the UE may use the first spatial configuration as the second spatial configuration when the second uplink control message transmission occurs within a threshold time period of the first uplink control message. In other aspects, the base station may transmit a signal to the UE configuring the first spatial configuration and/or the second spatial configuration. In some aspects, the second spatial configuration may be considered the default spatial relation information.

Figure 6:
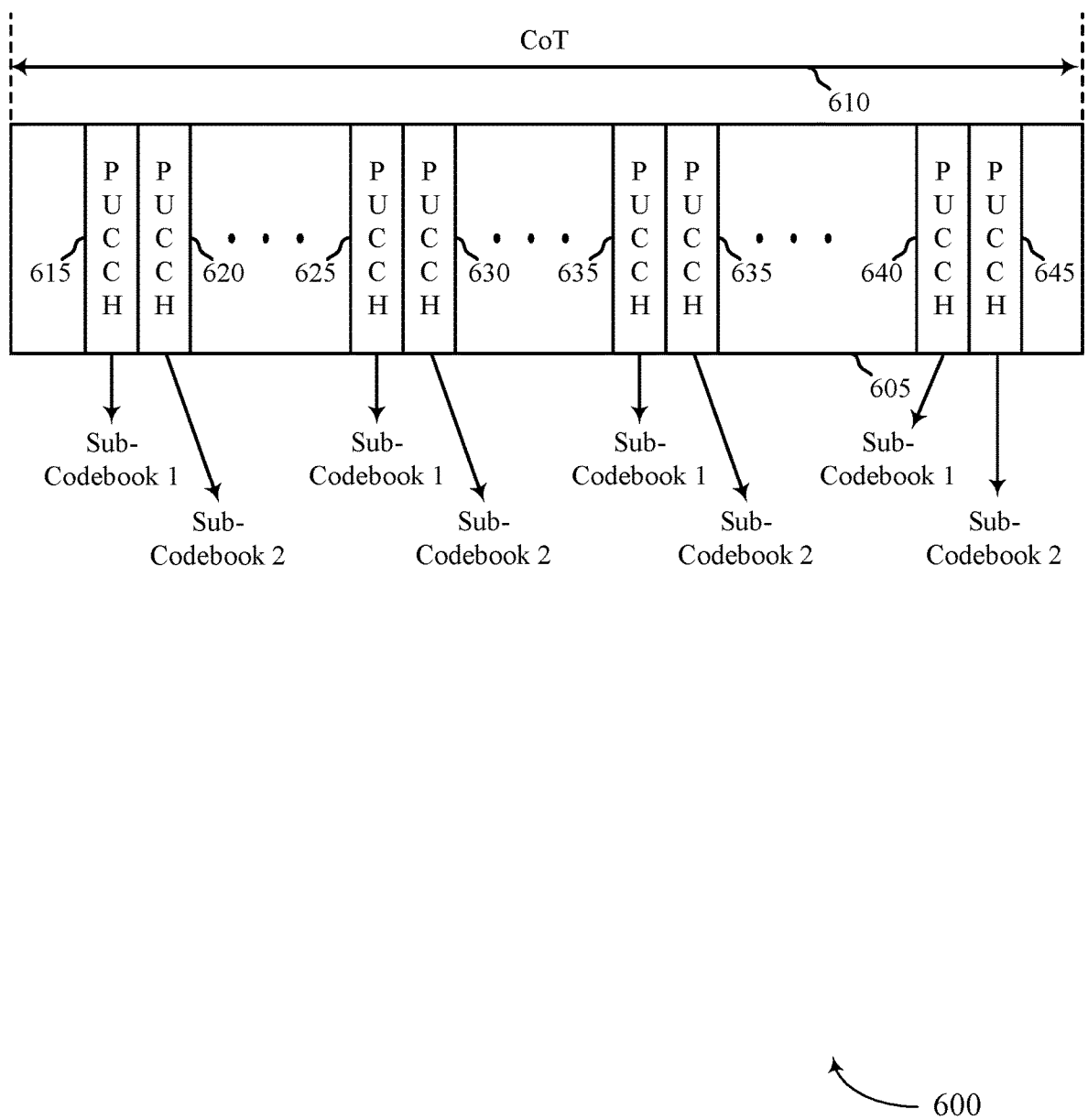
FIG. 6 illustrates an example of a codebook transmission configuration that supports uplink control channel codebook design in NR unlicensed in accordance with aspects of the present disclosure.

FIG. 6 illustrates an example of a codebook transmission configuration 600 that supports uplink control channel codebook design in NR unlicensed in accordance with aspects of the present disclosure. In some examples, codebook transmission configuration 600 may implement aspects of wireless communication systems 100 and/or 200. Aspects of codebook transmission configuration 600 may be implemented by a base station and/or UE, which may be examples of corresponding devices described herein. Generally, codebook transmission configuration 600 illustrates one example of how and/or where the first sub-codebook and/or the second sub-codebook may be communicated from a UE to a base station.

As discussed above, the UE may monitor a set of channels associated with the transmission window during a monitoring window. The UE may identify a subset of channels in which signals are detected during the monitoring window. The UE may select the format for a first sub-codebook and/or the second sub-codebook based at least in part on the channels in the subset of channels. That is, the UE would select a format (e.g., a payload size) for a feedback report (e.g., using the second sub-codebook) based on which channels will be reported in the feedback report. The UE would add one or more bits in the feedback report using the second sub-codebook for candidate PDSCH occasions that are associated with channels in which the signal was detected on the channel during the monitoring window. The UE may use the first sub-codebook to inform the base station of the size and/or format of the second sub-codebook and/or identify the channels within the subset of channels. The UE may use a second sub-codebook to provide the feedback state for the corresponding downlink data transmissions received during the transmission window (e.g., the feedback report). It is to be understood that codebook transmission configuration 600 illustrates one, non-limiting example of how the first sub-codebook and the second sub-codebook are transmitted to the base station on channel 605, but that the described techniques are not limited to a single channel 605.

For example, channel 605 may include a channel within the plurality of channels configured for the transmission window. Channel 605 may have a corresponding channel occupancy time 610 in which wireless communications are performed on the channel. Generally, the duration of the channel occupancy time 610 may be based at least in part on the LBT procedure performed by the base station. In some aspects, channel 605 may be an unlicensed or shared radio frequency spectrum band channel that spans the channel occupancy time 610.

In some aspects, the UE may identify channel 605 as a channel within the subset of channels based on the UE detecting a signal over channel 605 during the monitoring window. In some aspects, channel 605 is associated with the reporting occasion used to transmit a feedback report (e.g., the second uplink control message) to the base station.

In some aspects, since the first sub-codebook includes a starting window report (e.g., starting window for the reporting occasion where the UE transmits the second uplink control message using the second sub-codebook), the first sub-codebook may be transmitted close in time to the second sub-codebook. The base station may configure the same spatial relation information (or spatial configuration) or different spatial relation information for the first sub-codebook and the second sub-codebook. If the UE does not have time to switch transmit beams, the UE could transmit the second sub-codebook with the same beam as is used to transmit the first sub-codebook. If the base station does not have time to switch the receive beam, the base station could receive the second sub-codebook with the same receive beam as is used to receive the first sub-codebook and/or use some default receive beam.

Accordingly, the UE may transmit the first uplink control message using the first sub-codebook in PUCCH 615, and optionally retransmit one or more instances of the first sub-codebook in PUCCH 625, 635, and/or 640. The UE may transmit the first uplink control message using the first sub-codebook according to a first spatial configuration. The UE may transmit one or more instances of the second sub-codebook (e.g., the second uplink control message using the second sub-codebook) in PUCCH 620, 630, 635, and/or 645. The UE may use a second spatial configuration to transmit the second sub-codebook. That is, the UE may use a default spatial configuration for transmitting the second sub-codebook or may reuse the first spatial configuration for transmitting the second sub-codebook. In some aspects, UE may use the first spatial configuration for transmitting the second sub-codebook based at least in part on the second sub-codebook being transmitted close in time to the first sub-codebook.

In some aspects, the UE may transmit the first sub-codebook in PUCCH 615 using the first spatial configuration and the second sub-codebook in PUCCH 620 using the first sub-codebook, and then use one or more other spatial configurations for transmitting additional instances of the second sub-codebook in PUCCH 630, 635, and/or 645.

Figure 7:
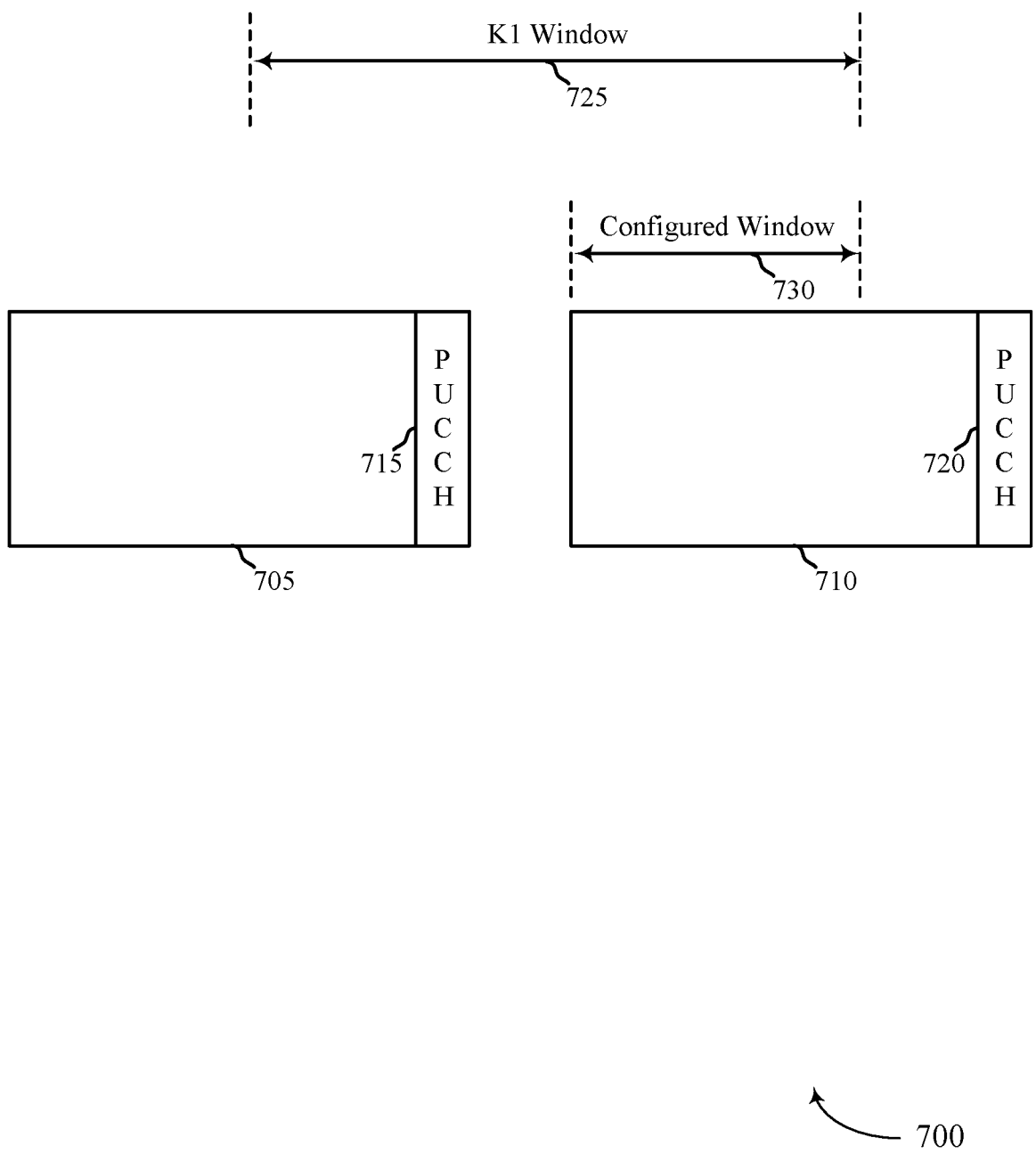
FIG. 7 illustrates an example of a codebook transmission configuration that supports uplink control channel codebook design in NR unlicensed in accordance with aspects of the present disclosure.

FIG. 7 illustrates an example of a codebook transmission configuration 700 that supports uplink control channel codebook design in NR unlicensed in accordance with aspects of the present disclosure. In some examples, codebook transmission configuration 700 may implement aspects of wireless communication systems 100 and/or 200, and/or codebook transmission configurations 300-600. Aspects of codebook transmission configuration 700 may be implemented by a base station and/or UE, which may be examples of corresponding devices described herein. In some aspects, codebook transmission configuration 700 may be implemented in a shared or unlicensed radio frequency spectrum band.

As discussed above, aspects of the described techniques may include a base station transmitting an indication of one or more active channels of a plurality of channels that are associated with a transmission window (e.g., K-1 window 725) configured for the UE. The base station may then perform downlink transmissions to the UE over the active channels during the transmission window, and then receive an uplink control message at a reporting occasion (e.g., a feedback report). In some aspects, the uplink control message may carry or convey an indication of feedback information for the downlink transmissions, with the format of the uplink control message being based, at least in some aspects, on the indicated active channels.

For example, codebook transmission configuration 700 generally includes a first channel occupancy time 705 and a second channel occupancy time 710, which may correspond to at least one of the active channels. The first channel occupancy time 705 may include PUCCH 715, and the second channel occupancy time 710 may include PUCCH 720. As discussed above, the base station may indicate the active channels to the UE, along with an indication of a starting window of the downlink grant (e.g., the configured window 730). In some aspects, the UE may monitor the second channel occupancy time 710 during the configured window 730 to receive a downlink grant for a corresponding downlink transmission. The UE may transmit an uplink control message during a reporting occasion in PUCCH 720 that carries or otherwise conveys feedback information for the downlink transmission.

Accordingly, the base station signals both the active channels and a starting window (e.g., the configured window 730) of the downlink grant. This may be applicable to the case where the base station requests the feedback information from the UE only for the same channel occupancy time (e.g., for channel occupancy time 710). To reduce overhead, the higher layer may configure some table combinations of channels and starting windows, where the base station transmits or otherwise conveys an index to that table.

Figure 8:
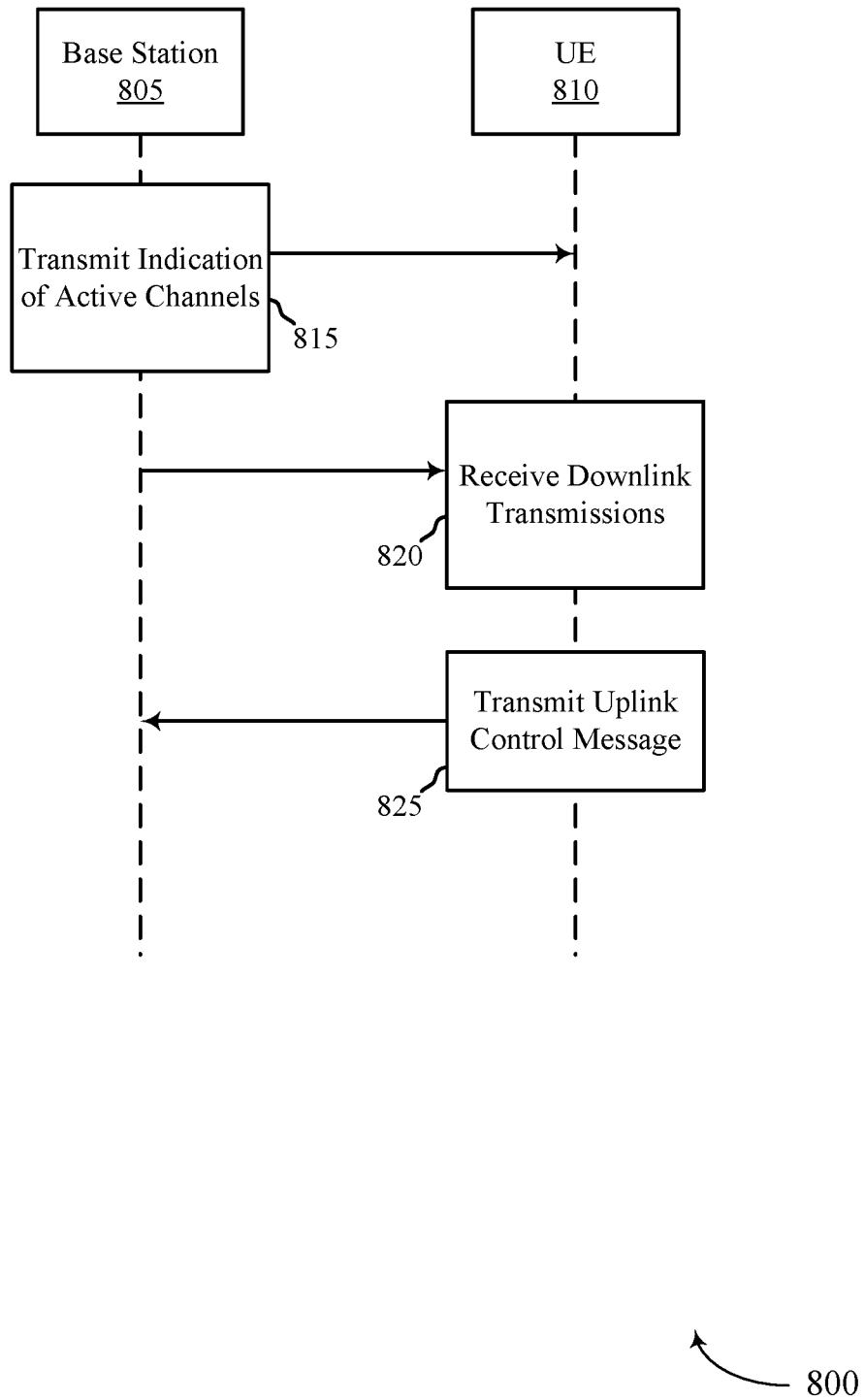
FIG. 8 illustrates an example of a process that supports uplink control channel codebook design in NR unlicensed in accordance with aspects of the present disclosure.

FIG. 8 illustrates an example of a process 800 that supports uplink control channel codebook design in NR unlicensed in accordance with aspects of the present disclosure. In some examples, process 800 may implement aspects of wireless communication systems 100 and/or 200, and/or codebook transmission configurations 300, 400, 500, 600, and/or 700. Aspects of process 800 may be implemented by base station 805 and/or UE 810, which may be examples of the corresponding devices described herein.

At 815, base station 805 may transmit (and UE 810 may receive) an indication of one or more active channels of the plurality of channels in an unlicensed radio frequency spectrum band. In some aspects, the plurality of channels may be associated with the transmission window (e.g., K-1 window) configured for UE 810. In some aspects, this may include base station 805 transmitting or otherwise providing an indication of a signal identifying a starting window for transmission of a grant for one or more of the plurality of downlink transmissions. In some aspects, the signal may carry or otherwise convey an index mapping the one or more active channels to the starting window. In some aspects, base station 805 may transmit the indication of the active channels in a broadcast transmission, in a group-based transmission, in a unicast transmission, and the like. In some aspects, base station 805 may transmit the indication of the active channels periodically, aperiodically, as needed, and the like. In some aspects, the plurality of channels may comprise channels in an unlicensed or shared radio frequency spectrum band.

At 820, base station 805 may transmit (and UE 810 may receive) a plurality of downlink transmissions over the one or more active channels during the transmission window. In some aspects, the downlink transmissions may comprise downlink data transmissions, which may also be referred to as PDSCH transmissions. In some aspects, each downlink data transmission may be transmitted during a corresponding downlink data transmission occasion, e.g., PDSCH occasion.

At 825, UE 810 may transmit (and base station 805 may receive) an uplink control message at a reporting occasion. In some aspects, the reporting occasion may be associated with the transmission window and/or configured for at least one of the downlink data transmissions. In some aspects, the uplink control message (e.g., the feedback report) may carry or convey an indication of feedback information for the plurality of downlink transmissions. In some aspects, the format of the uplink control message may be based, at least in some aspects, on the indication of the one or more active channels.

Figure 9:
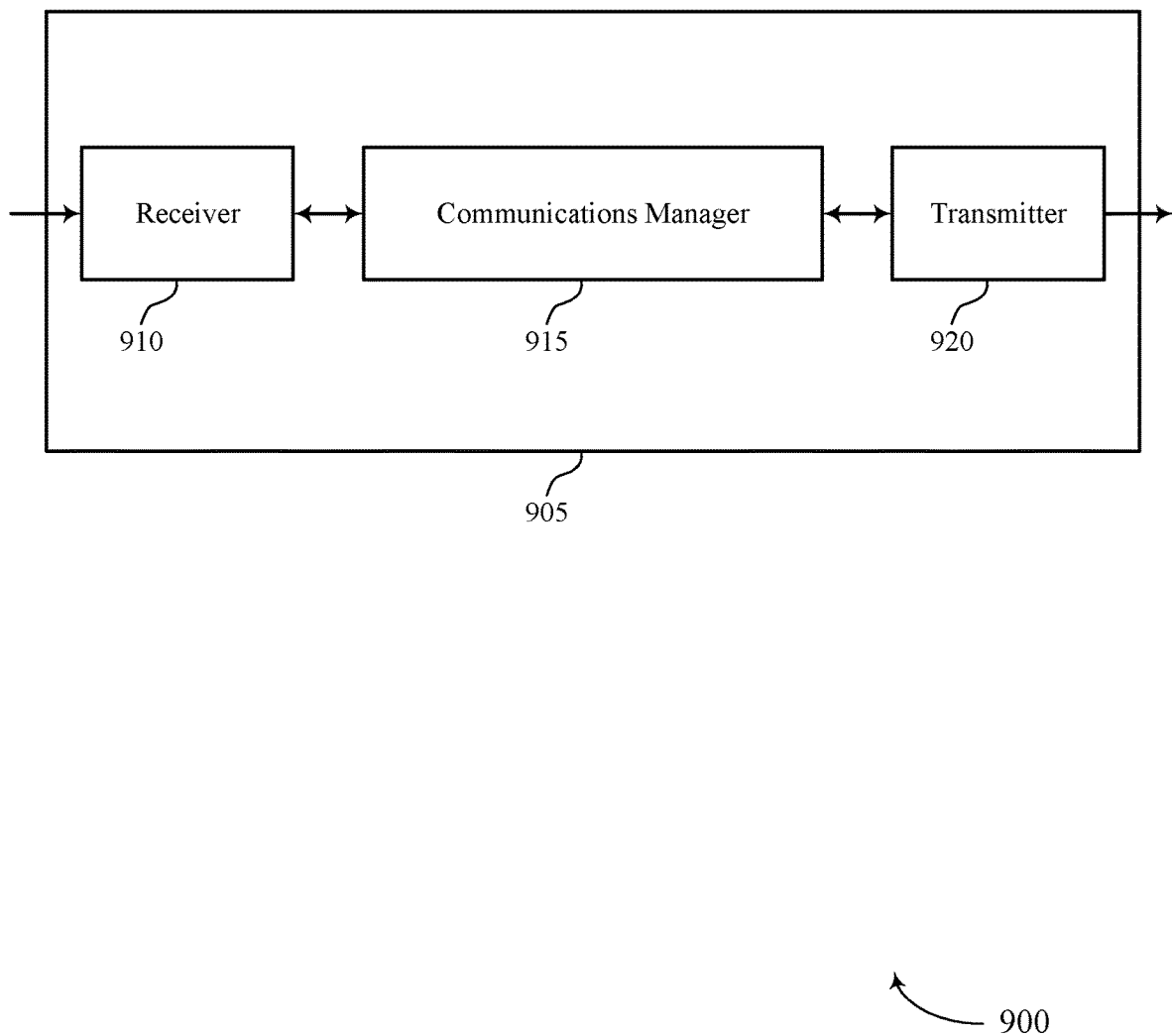
FIGS. 9 and 10 show block diagrams of devices that support uplink control channel codebook design in NR unlicensed in accordance with aspects of the present disclosure.

FIG. 9 shows a block diagram 900 of a device 905 that supports uplink control channel codebook design in NR unlicensed in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink control channel codebook design in NR unlicensed, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify, based on monitoring a set of channels for signals during a monitoring window, a subset of channels in which signals were detected during the monitoring window, select, based on the subset of channels, a format for a first sub-codebook and a second sub-codebook, the second sub-codebook indicating a feedback state for corresponding data transmissions received on the channels within the subset of channels, transmit the first uplink control message using a first sub-codebook, the first uplink control message identifying the format for the second sub-codebook and identifying the channels within the subset of channels, and transmit a second uplink control message using the second sub-codebook according to the selected format, the second uplink control message including the feedback state for the corresponding data transmissions received on the channels within the subset of channels during a transmission window.

The communications manager 915 may also receive an indication of one or more active channels of a set of channels in an unlicensed radio frequency spectrum band, the set of channels associated with a transmission window configured for the UE, receive a set of downlink transmissions over the one or more active channels of the set of channels during the transmission window, and transmit an uplink control message at a reporting occasion associated with the transmission window, the uplink control message including feedback information for the set of downlink transmissions, where a format of the uplink control message is based on the indication of the one or more active channels. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
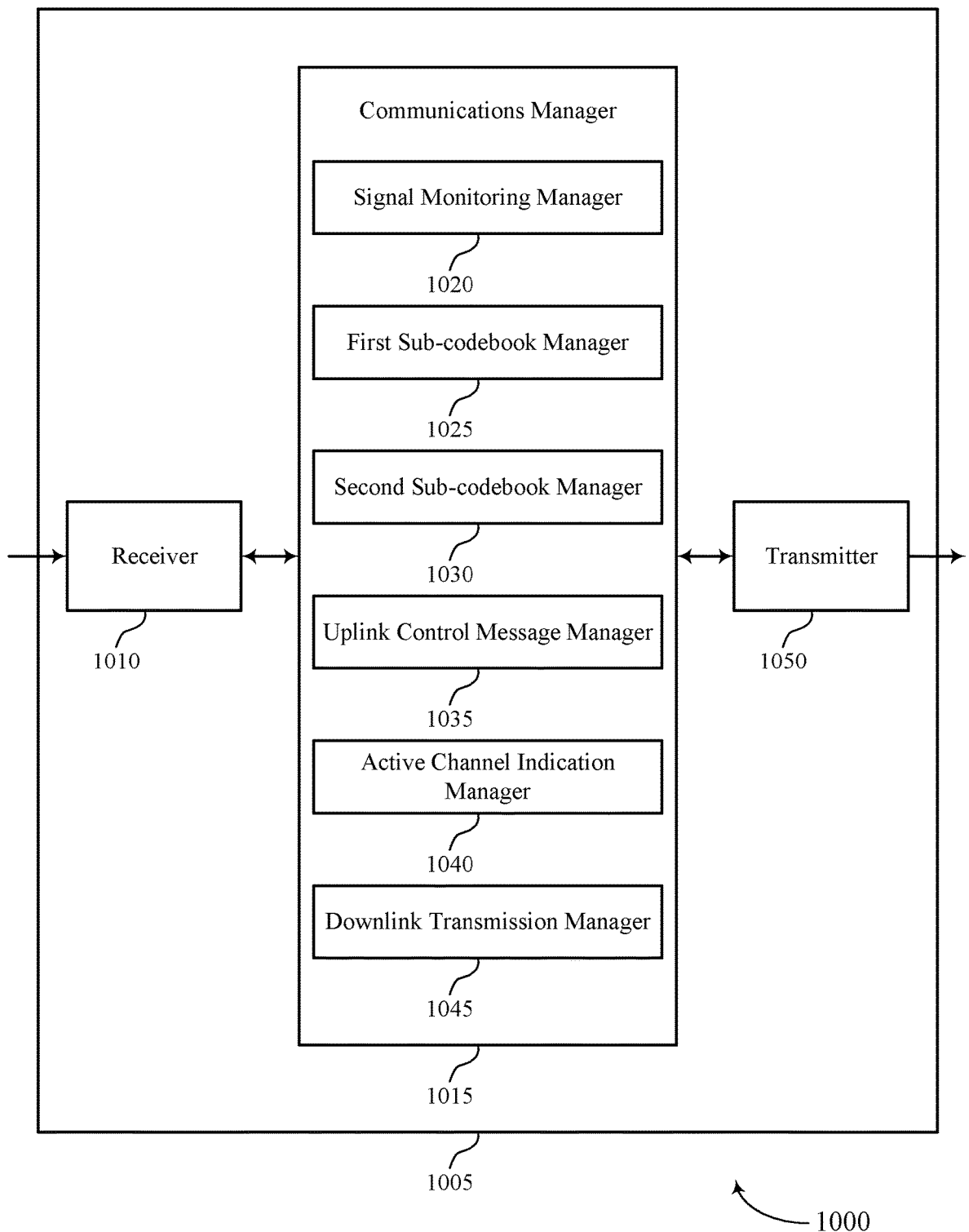

FIG. 10 shows a block diagram 1000 of a device 1005 that supports uplink control channel codebook design in NR unlicensed in accordance with aspects of the present disclosure. The device 1005 may be an example of aspects of a device 905, or a UE 115 as described herein. The device 1005 may include a receiver 1010, a communications manager 1015, and a transmitter 1050. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink control channel codebook design in NR unlicensed, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a signal monitoring manager 1020, a first sub-codebook manager 1025, a second sub-codebook manager 1030, an uplink control message manager 1035, an active channel indication manager 1040, and a downlink transmission manager 1045. The communications manager 1015 may be an example of aspects of the communications manager 1210 described herein.

The signal monitoring manager 1020 may identify, based on monitoring a set of channels for signals during a monitoring window, a subset of channels in which signals were detected during the monitoring window.

The first sub-codebook manager 1025 may select, based on the subset of channels, a format for a first sub-codebook and a second sub-codebook, the second sub-codebook indicating a feedback state for corresponding data transmissions received on the channels within the subset of channels.

The second sub-codebook manager 1030 may transmit the first uplink control message using a first sub-codebook, the first uplink control message identifying the format for the second sub-codebook and identifying the channels within the subset of channels.

The uplink control message manager 1035 may transmit a second uplink control message using the second sub-codebook according to the selected format, the second uplink control message including the feedback state for the corresponding data transmissions received on the channels within the subset of channels during a transmission window.

The active channel indication manager 1040 may receive an indication of one or more active channels of a set of channels in an unlicensed radio frequency spectrum band, the set of channels associated with a transmission window configured for the UE.

The downlink transmission manager 1045 may receive a set of downlink transmissions over the one or more active channels of the set of channels during the transmission window.

The uplink control message manager 1035 may transmit an uplink control message at a reporting occasion associated with the transmission window, the uplink control message including feedback information for the set of downlink transmissions, where a format of the uplink control message is based on the indication of the one or more active channels.

The transmitter 1050 may transmit signals generated by other components of the device 1005. In some examples, the transmitter 1050 may be collocated with a receiver 1010 in a transceiver module. For example, the transmitter 1050 may be an example of aspects of the transceiver 1220 described with reference to FIG. 12. The transmitter 1050 may utilize a single antenna or a set of antennas.

Figure 11:
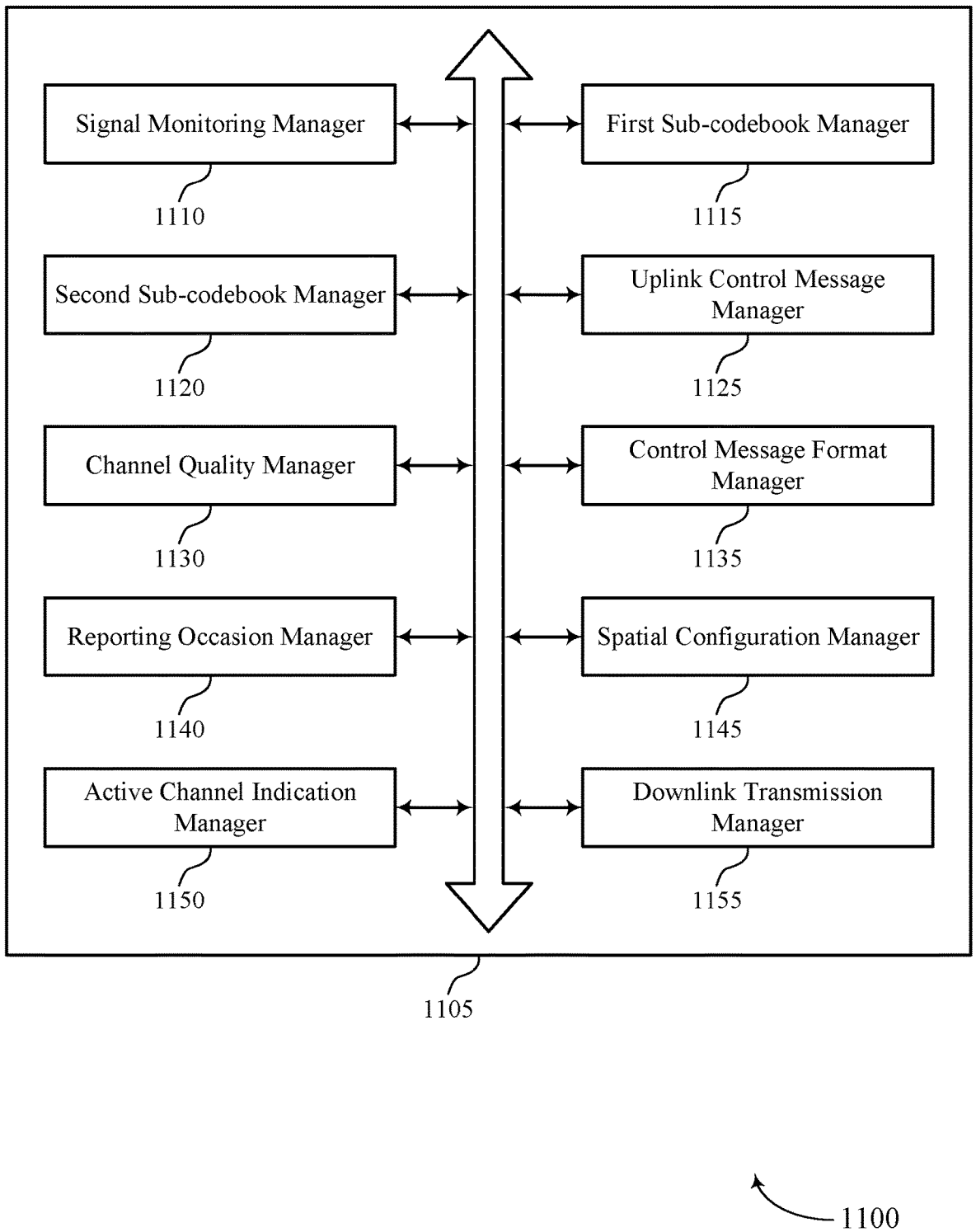
FIG. 11 shows a block diagram of a communications manager that supports uplink control channel codebook design in NR unlicensed in accordance with aspects of the present disclosure.

FIG. 11 shows a block diagram 1100 of a communications manager 1105 that supports uplink control channel codebook design in NR unlicensed in accordance with aspects of the present disclosure. The communications manager 1105 may be an example of aspects of a communications manager 915, a communications manager 1015, or a communications manager 1210 described herein. The communications manager 1105 may include a signal monitoring manager 1110, a first sub-codebook manager 1115, a second sub-codebook manager 1120, an uplink control message manager 1125, a channel quality manager 1130, a control message format manager 1135, a reporting occasion manager 1140, a spatial configuration manager 1145, an active channel indication manager 1150, and a downlink transmission manager 1155. Each of these modules may communicate, directly or indirectly, with one another (e.g., via one or more buses).

The signal monitoring manager 1110 may identify, based on monitoring a set of channels for signals during a monitoring window, a subset of channels in which signals were detected during the monitoring window.

The first sub-codebook manager 1115 may select, based on the subset of channels, a format for a first sub-codebook and a second sub-codebook, the second sub-codebook indicating a feedback state for corresponding data transmissions received on the channels within the subset of channels.

The second sub-codebook manager 1120 may transmit the first uplink control message using a first sub-codebook, the first uplink control message identifying the format for the second sub-codebook and identifying the channels within the subset of channels.

The uplink control message manager 1125 may transmit a second uplink control message using the second sub-codebook according to the selected format, the second uplink control message including the feedback state for the corresponding data transmissions received on the channels within the subset of channels during a transmission window.

In some examples, the uplink control message manager 1125 may transmit an uplink control message at a reporting occasion associated with the transmission window, the uplink control message including feedback information for the set of downlink transmissions, where a format of the uplink control message is based on the indication of the one or more active channels.

In some examples, the uplink control message manager 1125 may receive a confirmation signal confirming receipt of the first uplink control message, where the one or more instances of the second uplink control messages are transmitted based on the confirmation signal.

In some examples, the uplink control message manager 1125 may receive a confirmation signal confirming receipt of the first uplink control message, where the one or more instances of the second uplink control message are transmitted based on the confirmation signal.

In some examples, the uplink control message manager 1125 may two or more instances of the first uplink control message are transmitted in physical uplink control channel transmissions occurring within a channel occupancy time.

In some examples, the uplink control message manager 1125 may between each instance of the first uplink control message transmission, one or more instances of the second uplink control message are transmitted in physical uplink control channel transmissions occurring within the channel occupancy time.

In some cases, the first uplink control message is transmitted in a clear-to-send transmission occurring prior to a channel occupancy time. In some cases, one or more instances of the second uplink control message are transmitted in a physical uplink control channel transmission occurring within the channel occupancy time. In some cases, the first uplink control message is transmitted in a physical uplink control channel transmission occurring during to a channel occupancy time. In some cases, one or more instances of the second uplink control message are transmitted in subsequent physical uplink control channel transmissions occurring within the channel occupancy time.

In some cases, the indication of the one or more active channels is received in at least one of a broadcast transmission, a group-based transmission, a unicast transmission, or a combination thereof. In some cases, the indication of the one or more active channels is received in at least one of a periodic transmission, an aperiodic transmission, an as-needed transmission, or a combination thereof.

The active channel indication manager 1150 may receive an indication of one or more active channels of a set of channels in an unlicensed radio frequency spectrum band, the set of channels associated with a transmission window configured for the UE.

The downlink transmission manager 1155 may receive a set of downlink transmissions over the one or more active channels of the set of channels during the transmission window.

The channel quality manager 1130 may determine, based on the monitoring, that the channels in the subset of channels satisfy a channel quality metric, where the channels in the subset of channels are identified based on the determining.

The control message format manager 1135 may configure a bitmap of the first uplink control message based on the first sub-codebook to identify the channels within the subset of channels.

The reporting occasion manager 1140 may indicate, in the first uplink control message and for each channel in the subset of channels, a starting point of a reporting occasion in which the second uplink control message will be transmitted.

In some examples, the reporting occasion manager 1140 may indicate, in the first uplink control message and for each channel in the set of channels that is not included in the subset of channels, a NULL value as a starting point of a reporting occasion in which the second uplink control message will be transmitted.

In some examples, the reporting occasion manager 1140 may receive a signal identifying a starting window for transmission of a grant for one or more of the set of downlink transmissions. In some cases, the signal conveys an index mapping the one or more active channels to the starting window.

The spatial configuration manager 1145 may identify a first spatial configuration used for transmitting the first uplink control message transmission. In some examples, the spatial configuration manager 1145 may select a second spatial configuration to use for transmitting the second uplink control message transmission based on the first spatial configuration. In some examples, the spatial configuration manager 1145 may select the first spatial configuration as the second spatial configuration based on the second uplink control message transmission occurring within a threshold time period of the first uplink control message transmission.

In some examples, the spatial configuration manager 1145 may receive a signal configuring at least one of the first spatial configuration, the second spatial configuration, or a combination thereof.

Figure 12:
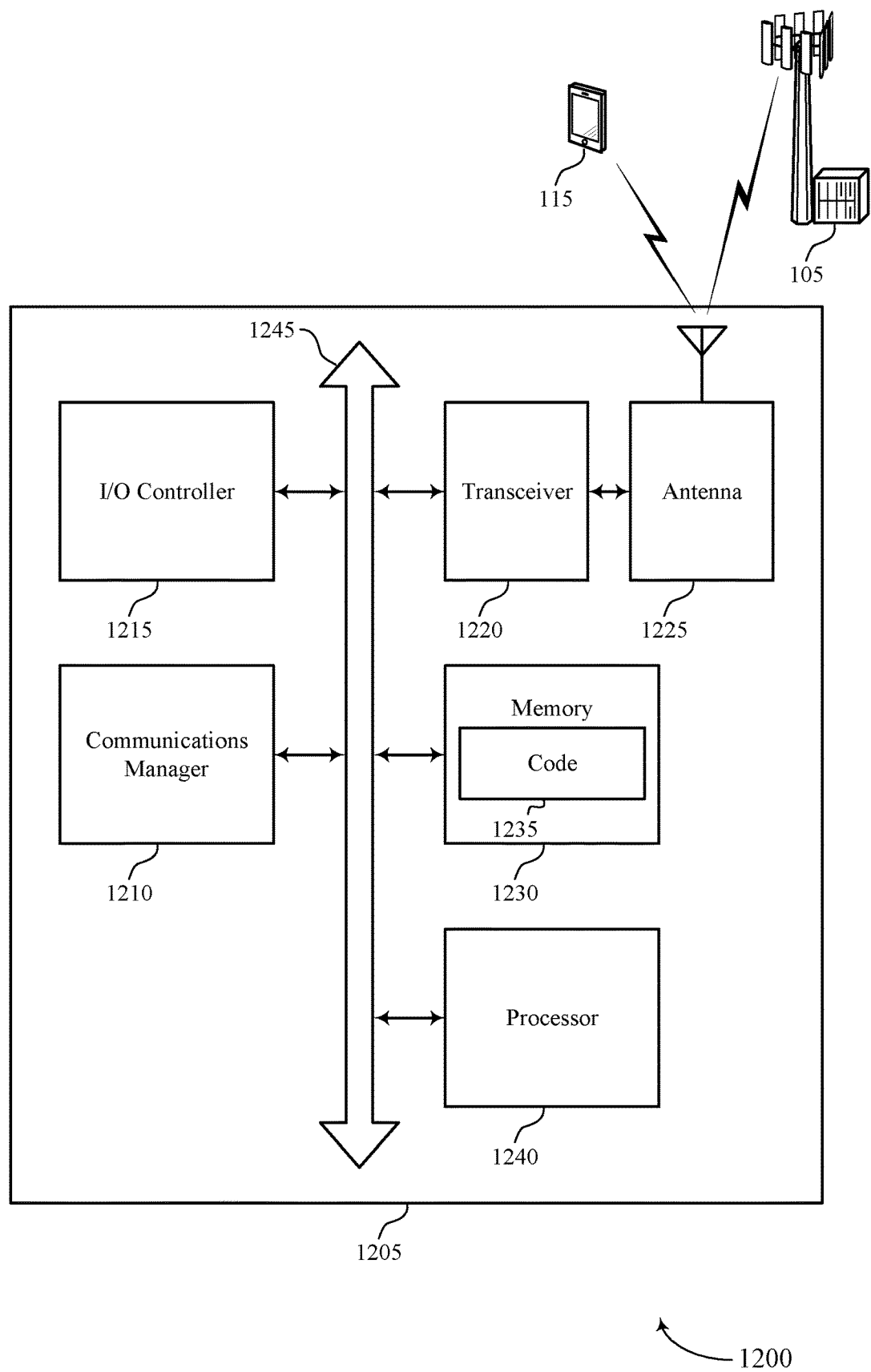
FIG. 12 shows a diagram of a system including a device that supports uplink control channel codebook design in NR unlicensed in accordance with aspects of the present disclosure.

FIG. 12 shows a diagram of a system 1200 including a device 1205 that supports uplink control channel codebook design in NR unlicensed in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may identify, based on monitoring a set of channels for signals during a monitoring window, a subset of channels in which signals were detected during the monitoring window, select, based on the subset of channels, a format for a first sub-codebook and a second sub-codebook, the second sub-codebook indicating a feedback state for corresponding data transmissions received on the channels within the subset of channels, transmit the first uplink control message using a first sub-codebook, the first uplink control message identifying the format for the second sub-codebook and identifying the channels within the subset of channels, and transmit a second uplink control message using the second sub-codebook according to the selected format, the second uplink control message including the feedback state for the corresponding data transmissions received on the channels within the subset of channels during a transmission window.

The communications manager 1210 may also receive an indication of one or more active channels of a set of channels in an unlicensed radio frequency spectrum band, the set of channels associated with a transmission window configured for the UE, receive a set of downlink transmissions over the one or more active channels of the set of channels during the transmission window, and transmit an uplink control message at a reporting occasion associated with the transmission window, the uplink control message including feedback information for the set of downlink transmissions, where a format of the uplink control message is based on the indication of the one or more active channels.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting uplink control channel codebook design in NR unlicensed).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
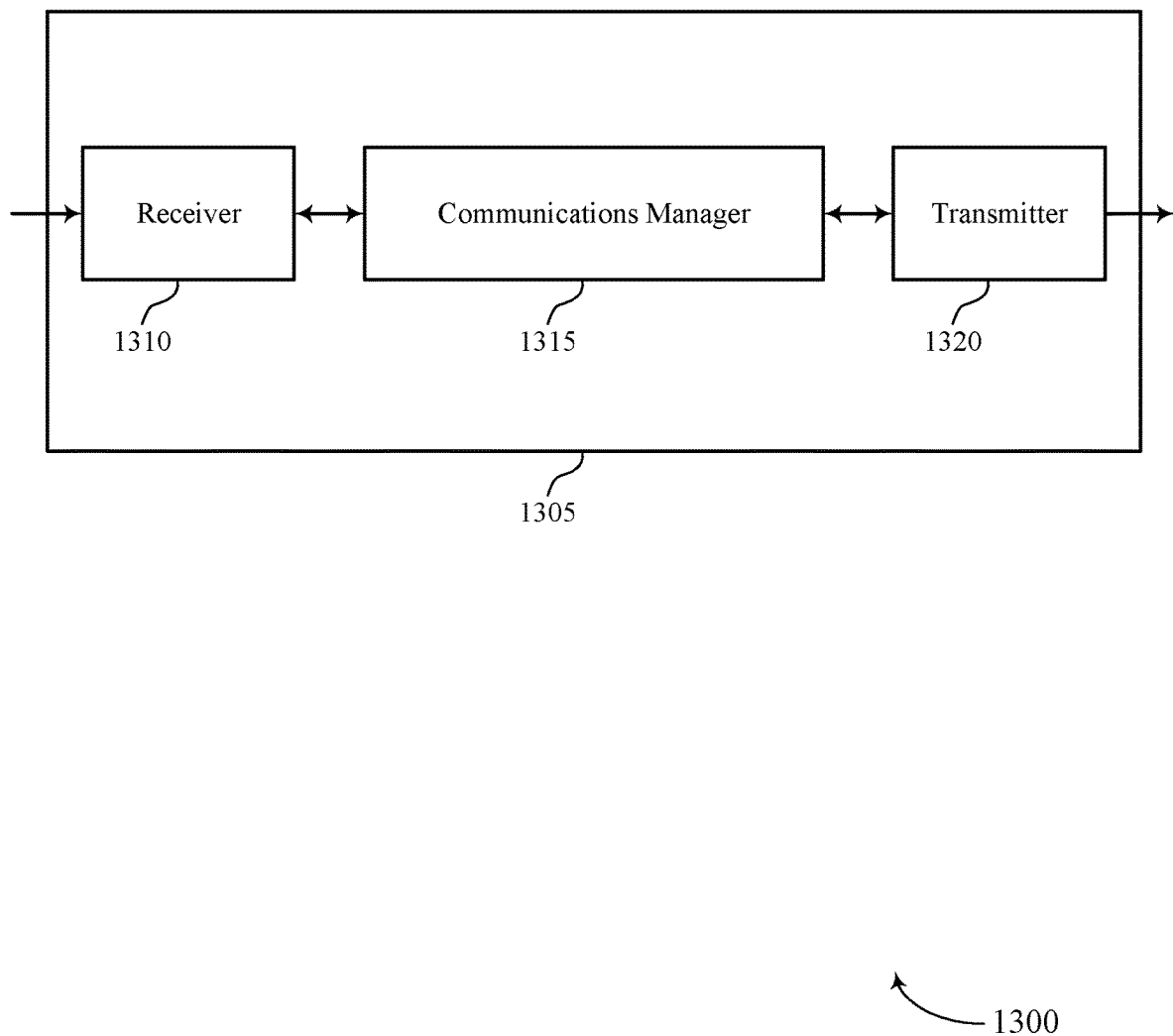
FIGS. 13 and 14 show block diagrams of devices that support uplink control channel codebook design in NR unlicensed in accordance with aspects of the present disclosure.

FIG. 13 shows a block diagram 1300 of a device 1305 that supports uplink control channel codebook design in NR unlicensed in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to uplink control channel codebook design in NR unlicensed, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit an indication of one or more active channels of a set of channels in an unlicensed radio frequency spectrum band, the set of channels associated with a transmission window configured for a UE, perform a set of downlink transmissions to the UE over the one or more active channels of the set of channels during the transmission window, and receive, from the UE, an uplink control message at a reporting occasion associated with the transmission window, the uplink control message including feedback information for the set of downlink transmissions, where a format of the uplink control message is based on the indication of the one or more active channels. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
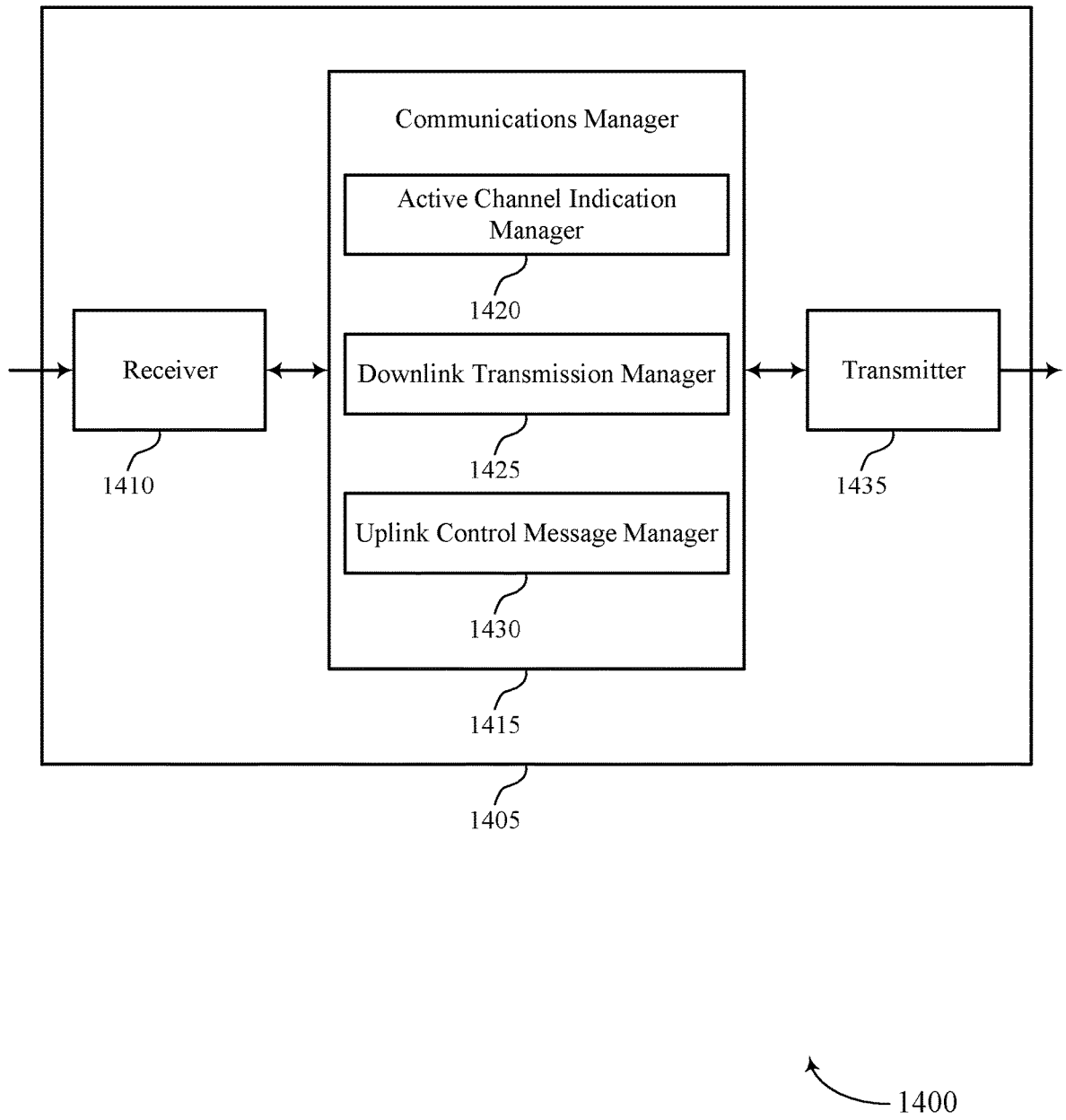

FIG. 14 shows a block diagram 1400 of a device 1405 that supports uplink control channel codebook design in NR unlicensed in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to uplink control channel codebook design in NR unlicensed, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include an active channel indication manager 1420, a downlink transmission manager 1425, and an uplink control message manager 1430. The communications manager 1415 may be an example of aspects of the communications manager 1610 described herein.

The active channel indication manager 1420 may transmit an indication of one or more active channels of a set of channels in an unlicensed radio frequency spectrum band, the set of channels associated with a transmission window configured for a UE.

The downlink transmission manager 1425 may perform a set of downlink transmissions to the UE over the one or more active channels of the set of channels during the transmission window.

The uplink control message manager 1430 may receive, from the UE, an uplink control message at a reporting occasion associated with the transmission window, the uplink control message including feedback information for the set of downlink transmissions, where a format of the uplink control message is based on the indication of the one or more active channels.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
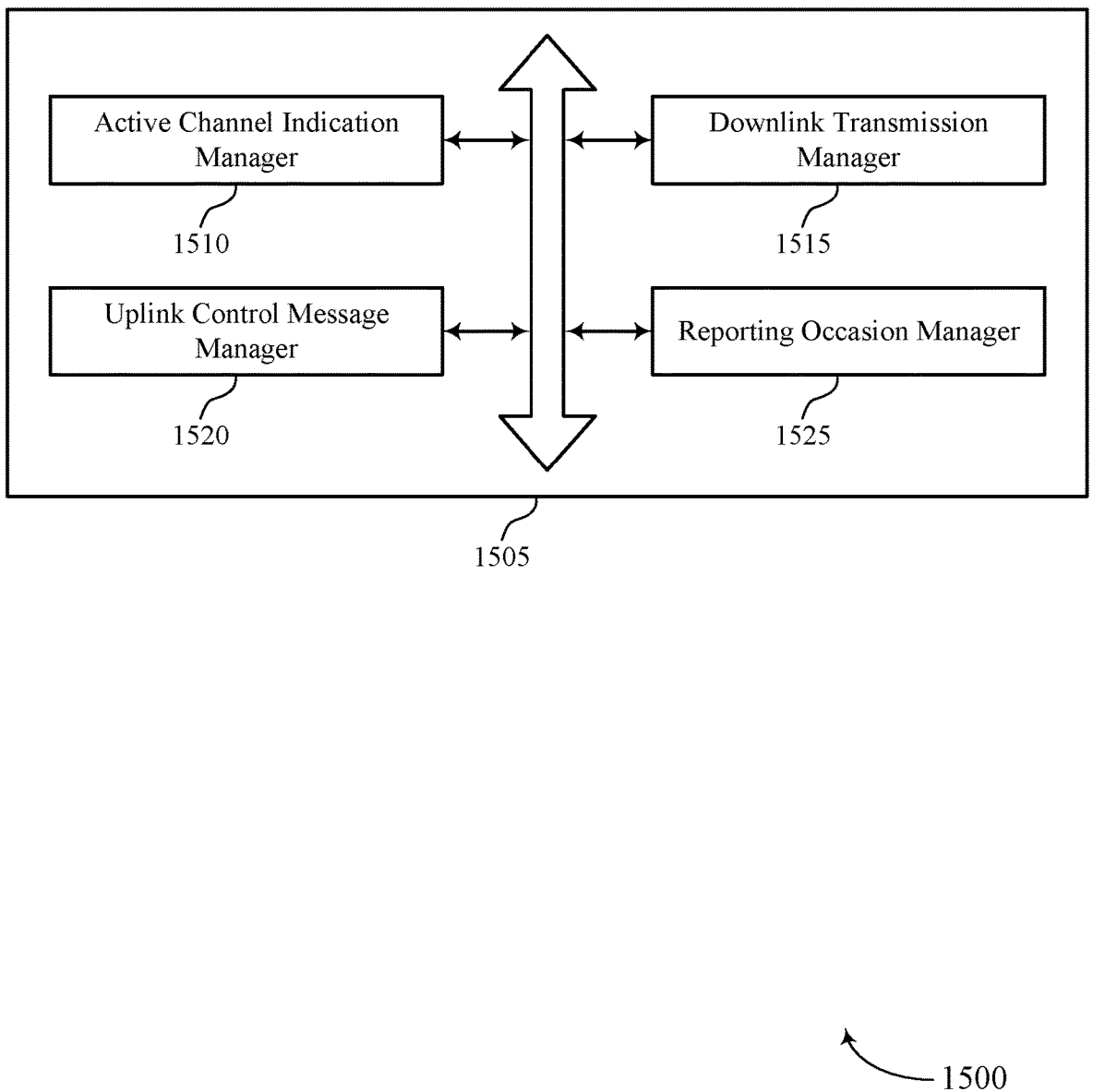
FIG. 15 shows a block diagram of a communications manager that supports uplink control channel codebook design in NR unlicensed in accordance with aspects of the present disclosure.

FIG. 15 shows a block diagram 1500 of a communications manager 1505 that supports uplink control channel codebook design in NR unlicensed in accordance with aspects of the present disclosure. The communications manager 1505 may be an example of aspects of a communications manager 1315, a communications manager 1415, or a communications manager 1610 described herein. The communications manager 1505 may include an active channel indication manager 1510, a downlink transmission manager 1515, an uplink control message manager 1520, and a reporting occasion manager 1525. Each of these modules may communicate, directly or indirectly, with one another (e.g., via one or more buses).

The active channel indication manager 1510 may transmit an indication of one or more active channels of a set of channels in an unlicensed radio frequency spectrum band, the set of channels associated with a transmission window configured for a UE. In some cases, the indication of the one or more active channels is transmitted in at least one of a broadcast transmission, a group-based transmission, a unicast transmission, or a combination thereof. In some cases, the indication of the one or more active channels is transmitted in at least one of a periodic transmission, an aperiodic transmission, an as-needed transmission, or a combination thereof.

The downlink transmission manager 1515 may perform a set of downlink transmissions to the UE over the one or more active channels of the set of channels during the transmission window.

The uplink control message manager 1520 may receive, from the UE, an uplink control message at a reporting occasion associated with the transmission window, the uplink control message including feedback information for the set of downlink transmissions, where a format of the uplink control message is based on the indication of the one or more active channels.

The reporting occasion manager 1525 may transmit a signal identifying a starting window for transmission of a grant for one or more of the set of downlink transmissions. In some cases, the signal conveys an index mapping the one or more active channels to the starting window.

Figure 16:
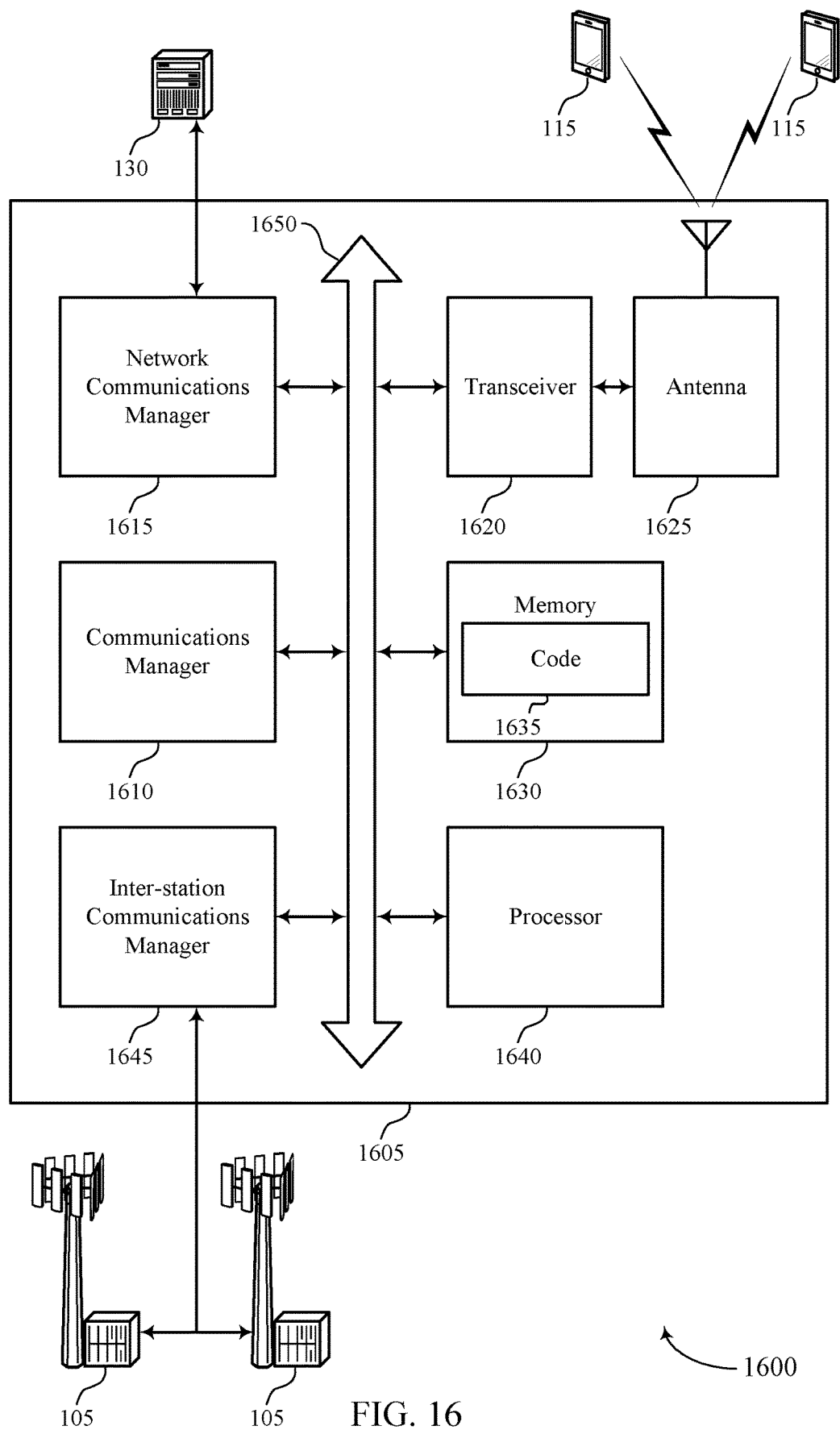
FIG. 16 shows a diagram of a system including a device that supports uplink control channel codebook design in NR unlicensed in accordance with aspects of the present disclosure.

FIG. 16 shows a diagram of a system 1600 including a device 1605 that supports uplink control channel codebook design in NR unlicensed in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit an indication of one or more active channels of a set of channels in an unlicensed radio frequency spectrum band, the set of channels associated with a transmission window configured for a UE, perform a set of downlink transmissions to the UE over the one or more active channels of the set of channels during the transmission window, and receive, from the UE, an uplink control message at a reporting occasion associated with the transmission window, the uplink control message including feedback information for the set of downlink transmissions, where a format of the uplink control message is based on the indication of the one or more active channels.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting uplink control channel codebook design in NR unlicensed).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
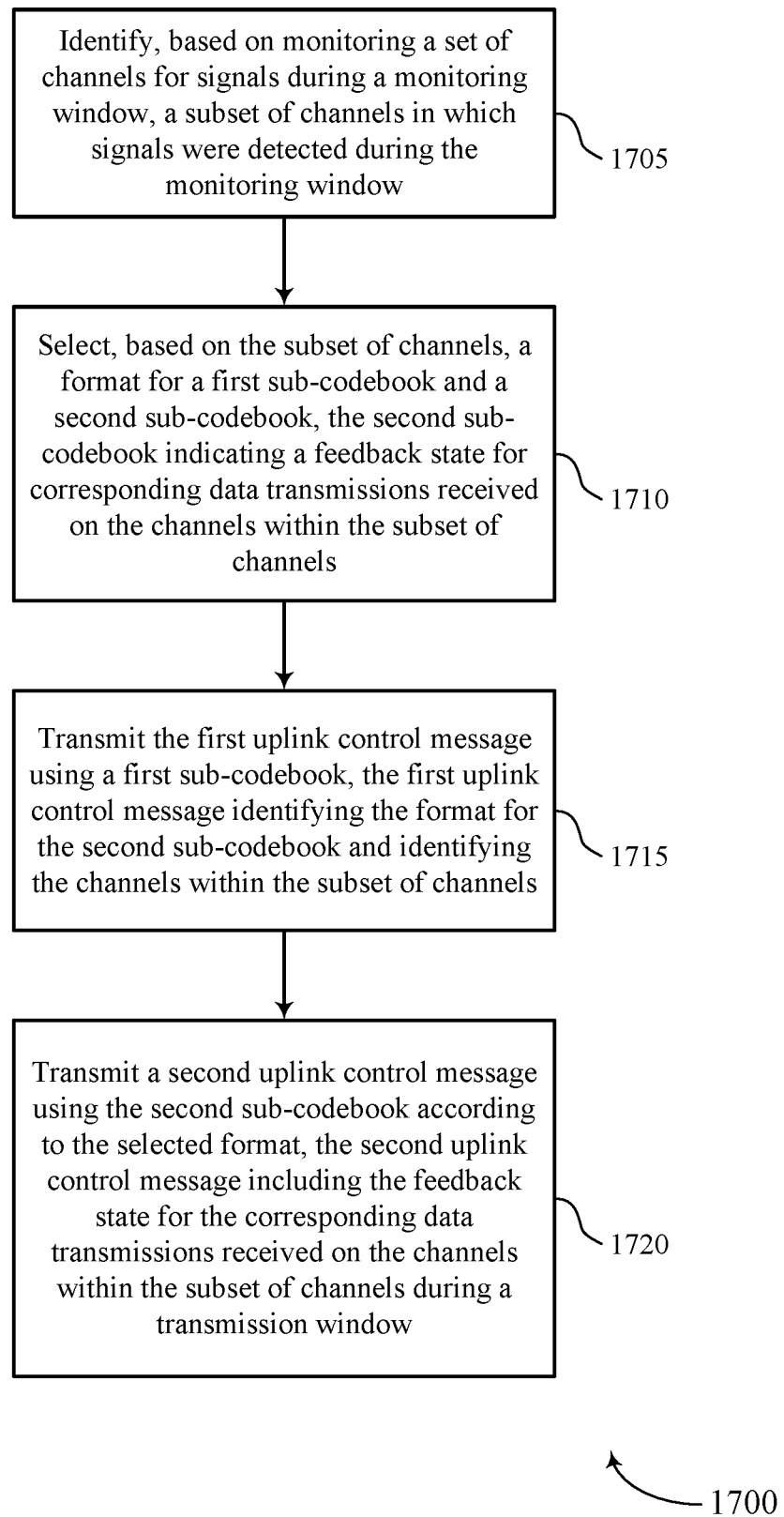
FIGS. 17 through 19 show flowcharts illustrating methods that support uplink control channel codebook design in NR unlicensed in accordance with aspects of the present disclosure.

FIG. 17 shows a flowchart illustrating a method 1700 that supports uplink control channel codebook design in NR unlicensed in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may identify, based on monitoring a set of channels for signals during a monitoring window, a subset of channels in which signals were detected during the monitoring window. The operations of 1705 may be performed according to the methods described herein. In some examples, aspects of the operations of 1705 may be performed by a signal monitoring manager as described with reference to FIGS. 9 through 12.

At 1710, the UE may select, based on the subset of channels, a format for a first sub-codebook and a second sub-codebook, the second sub-codebook indicating a feedback state for corresponding data transmissions received on the channels within the subset of channels. The operations of 1710 may be performed according to the methods described herein. In some examples, aspects of the operations of 1710 may be performed by a first sub-codebook manager as described with reference to FIGS. 9 through 12.

At 1715, the UE may transmit the first uplink control message using a first sub-codebook, the first uplink control message identifying the format for the second sub-codebook and identifying the channels within the subset of channels. The operations of 1715 may be performed according to the methods described herein. In some examples, aspects of the operations of 1715 may be performed by a second sub-codebook manager as described with reference to FIGS. 9 through 12.

At 1720, the UE may transmit a second uplink control message using the second sub-codebook according to the selected format, the second uplink control message including the feedback state for the corresponding data transmissions received on the channels within the subset of channels during a transmission window. The operations of 1720 may be performed according to the methods described herein. In some examples, aspects of the operations of 1720 may be performed by an uplink control message manager as described with reference to FIGS. 9 through 12.

Figure 18:
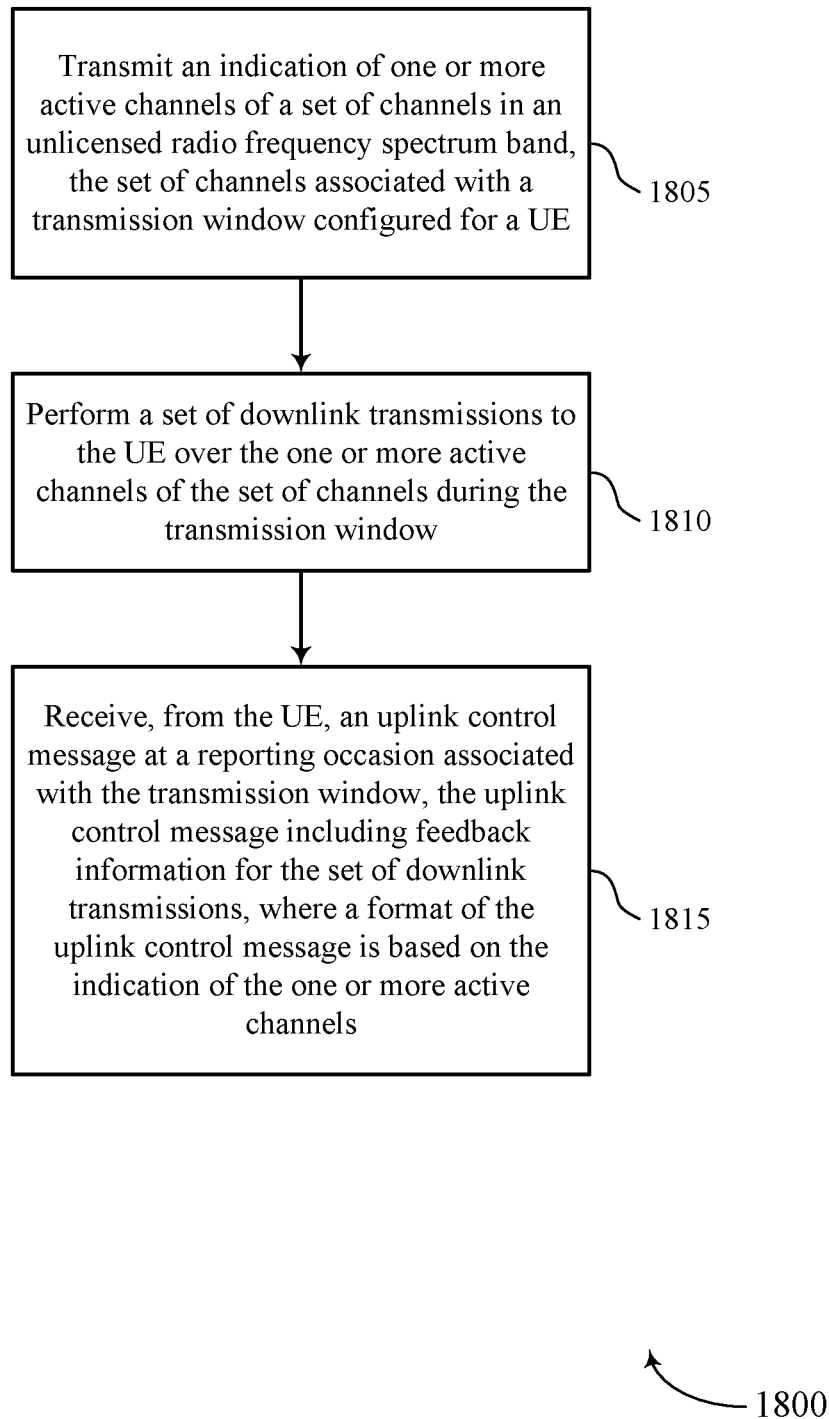

FIG. 18 shows a flowchart illustrating a method 1800 that supports uplink control channel codebook design in NR unlicensed in accordance with aspects of the present disclosure. The operations of method 1800 may be implemented by a base station 105 or its components as described herein. For example, the operations of method 1800 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1805, the base station may transmit an indication of one or more active channels of a set of channels in an unlicensed radio frequency spectrum band, the set of channels associated with a transmission window configured for a UE. The operations of 1805 may be performed according to the methods described herein. In some examples, aspects of the operations of 1805 may be performed by an active channel indication manager as described with reference to FIGS. 13 through 16.

At 1810, the base station may perform a set of downlink transmissions to the UE over the one or more active channels of the set of channels during the transmission window. The operations of 1810 may be performed according to the methods described herein. In some examples, aspects of the operations of 1810 may be performed by a downlink transmission manager as described with reference to FIGS. 13 through 16.

At 1815, the base station may receive, from the UE, an uplink control message at a reporting occasion associated with the transmission window, the uplink control message including feedback information for the set of downlink transmissions, where a format of the uplink control message is based on the indication of the one or more active channels. The operations of 1815 may be performed according to the methods described herein. In some examples, aspects of the operations of 1815 may be performed by an uplink control message manager as described with reference to FIGS. 13 through 16.

Figure 19:
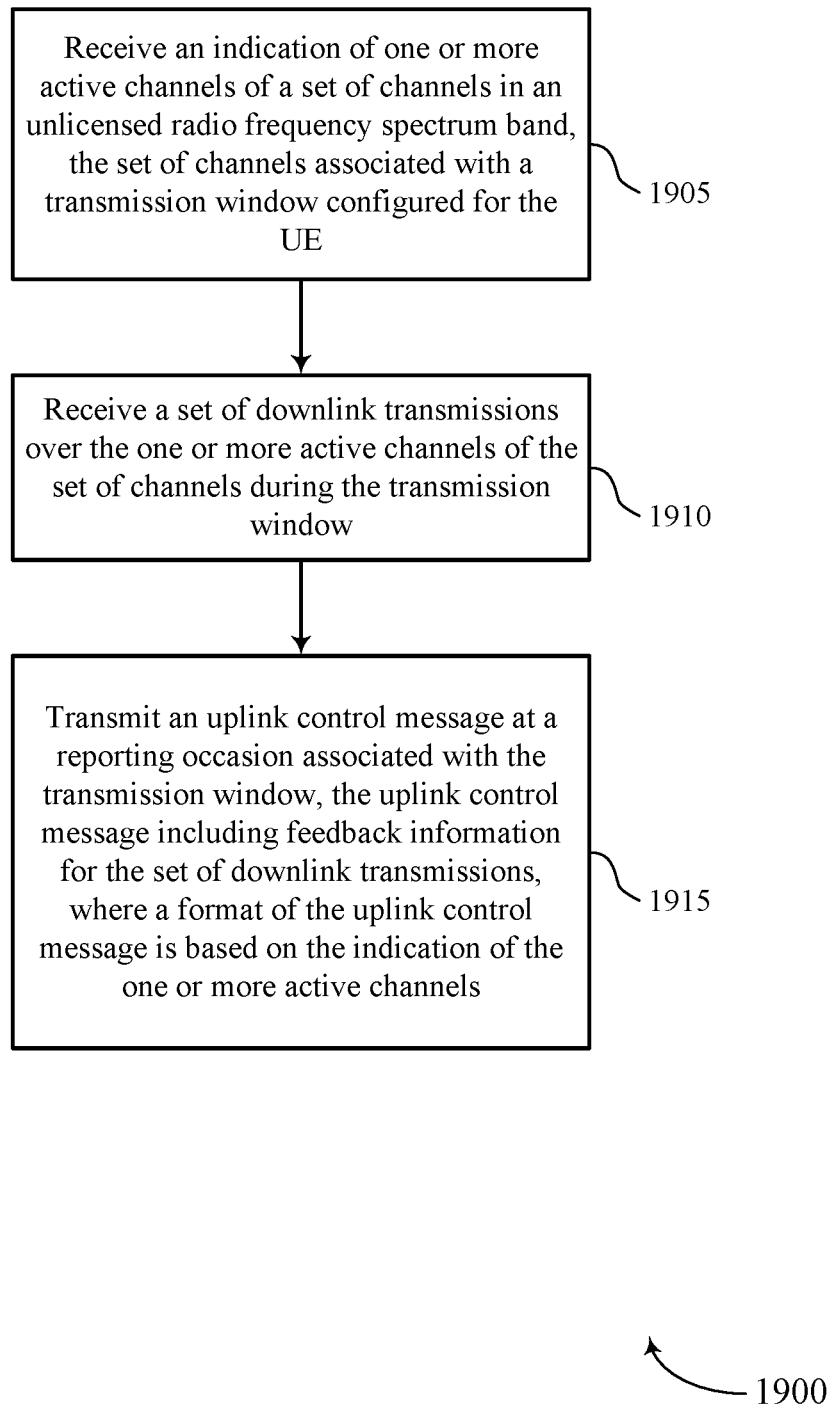

FIG. 19 shows a flowchart illustrating a method 1900 that supports uplink control channel codebook design in NR unlicensed in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may receive an indication of one or more active channels of a set of channels in an unlicensed radio frequency spectrum band, the set of channels associated with a transmission window configured for the UE. The operations of 1905 may be performed according to the methods described herein. In some examples, aspects of the operations of 1905 may be performed by an active channel indication manager as described with reference to FIGS. 9 through 12.

At 1910, the UE may receive a set of downlink transmissions over the one or more active channels of the set of channels during the transmission window. The operations of 1910 may be performed according to the methods described herein. In some examples, aspects of the operations of 1910 may be performed by a downlink transmission manager as described with reference to FIGS. 9 through 12.

At 1915, the UE may transmit an uplink control message at a reporting occasion associated with the transmission window, the uplink control message including feedback information for the set of downlink transmissions, where a format of the uplink control message is based on the indication of the one or more active channels. The operations of 1915 may be performed according to the methods described herein. In some examples, aspects of the operations of 1915 may be performed by an uplink control message manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    identifying, based at least in part on monitoring a set of channels for signals during a monitoring window, a subset of channels in which signals were detected during the monitoring window, the subset of channel comprising one or more channels from the set of channels;
    selecting, based at least in part on the subset of channels, a format for a first sub-codebook and a second sub-codebook, the second sub-codebook indicating a feedback state for corresponding data transmissions received on the one or more channels within the subset of channels;
    configuring a bitmap of a first uplink control message based at least in part on the first sub-codebook to identify the one or more channels within the subset of channels;
    transmitting the first uplink control message using the first sub-codebook, the first uplink control message identifying the format for the second sub-codebook and the bitmap identifying the one or more channels within the subset of channels; and
    transmitting a second uplink control message using the second sub-codebook according to the selected format, the second uplink control message comprising the feedback state for the corresponding data transmissions received on the one or more channels within the subset of channels during a transmission window.

2. The method of claim 1, further comprising:
    determining, based at least in part on the monitoring, that the one or more channels within the subset of channels satisfy a channel quality metric, wherein the one or more channels within the subset of channels are identified based at least in part on the determining.

3. The method of claim 1, further comprising:
    indicating, in the first uplink control message and for each channel of the one or more channels within the subset of channels, a starting point of a reporting occasion in which the second uplink control message will be transmitted.

4. The method of claim 3, further comprising:
    indicating, in the first uplink control message and for each channel in the set of channels that is not included in the subset of channels, a NULL value as a starting point of a reporting occasion in which the second uplink control message will be transmitted.

5. The method of claim 1, wherein:
    the first uplink control message is transmitted in a clear-to-send transmission occurring prior to a channel occupancy time; and
    one or more instances of the second uplink control message are transmitted in a physical uplink control channel transmission occurring within the channel occupancy time.

6. The method of claim 5, further comprising:
    receiving a confirmation signal confirming receipt of the first uplink control message, wherein the one or more instances of the second uplink control messages are transmitted based at least in part on the confirmation signal.

7. The method of claim 1, wherein:
the first uplink control message is transmitted in a physical uplink control channel transmission occurring during to a channel occupancy time; and
one or more instances of the second uplink control message are transmitted in subsequent physical uplink control channel transmissions occurring within the channel occupancy time.

8. The method of claim 7, further comprising:
receiving a confirmation signal confirming receipt of the first uplink control message, wherein the one or more instances of the second uplink control message are transmitted based at least in part on the confirmation signal.

9. The method of claim 1, wherein:
two or more instances of the first uplink control message are transmitted in physical uplink control channel transmissions occurring within a channel occupancy time; and
between each instance of the first uplink control message transmission, one or more instances of the second uplink control message are transmitted in physical uplink control channel transmissions occurring within the channel occupancy time.

10. The method of claim 1, further comprising:
identifying a first spatial configuration used for transmitting the first uplink control message transmission; and
selecting a second spatial configuration to use for transmitting the second uplink control message transmission based at least in part on the first spatial configuration.

11. The method of claim 10, further comprising:
selecting the first spatial configuration as the second spatial configuration based at least in part on the second uplink control message transmission occurring within a threshold time period of the first uplink control message transmission.

12. The method of claim 10, further comprising:
receiving a signal configuring at least one of the first spatial configuration, the second spatial configuration, or a combination thereof.

13. A method for wireless communications at a base station, comprising:
transmitting an indication of one or more active channels of a plurality of channels in an unlicensed radio frequency spectrum band, the plurality of channels associated with a transmission window configured for a user equipment (UE);
performing a plurality of downlink transmissions to the UE over the one or more active channels of the plurality of channels during the transmission window; and
receiving, from the UE, an uplink control message at a reporting occasion associated with the transmission window, the uplink control message comprising feedback information for the plurality of downlink transmissions, wherein a format of the uplink control message is based at least in part on the indication of the one or more active channels.

14. The method of claim 13, further comprising:
transmitting a signal identifying a starting window for transmission of a grant for one or more of the plurality of downlink transmissions.

15. The method of claim 14, wherein the signal conveys an index mapping the one or more active channels to the starting window.

16. The method of claim 13, wherein the indication of the one or more active channels is transmitted in at least one of a broadcast transmission, a group-based transmission, a unicast transmission, or a combination thereof.

17. The method of claim 13, wherein the indication of the one or more active channels is transmitted in at least one of a periodic transmission, an aperiodic transmission, an as-needed transmission, or a combination thereof.

18. A method for wireless communications at a user equipment (UE), comprising:
receiving an indication of one or more active channels of a plurality of channels in an unlicensed radio frequency spectrum band, the plurality of channels associated with a transmission window configured for the UE;
receiving a plurality of downlink transmissions over the one or more active channels of the plurality of channels during the transmission window; and
transmitting an uplink control message at a reporting occasion associated with the transmission window, the uplink control message comprising feedback information for the plurality of downlink transmissions, wherein a format of the uplink control message is based at least in part on the indication of the one or more active channels.

19. The method of claim 18, further comprising:
receiving a signal identifying a starting window for transmission of a grant for one or more of the plurality of downlink transmissions.

20. The method of claim 19, wherein the signal conveys an index mapping the one or more active channels to the starting window.

21. The method of claim 18, wherein the indication of the one or more active channels is received in at least one of a broadcast transmission, a group-based transmission, a unicast transmission, or a combination thereof.

22. The method of claim 18, wherein the indication of the one or more active channels is received in at least one of a periodic transmission, an aperiodic transmission, an as-needed transmission, or a combination thereof.

23. An apparatus for wireless communications at a user equipment (UE), comprising:
a processor,
memory in electronic communication with the processor; and
instructions stored in the memory and executable by the processor to cause the apparatus to:
identify, based at least in part on monitoring a set of channels for signals during a monitoring window, a subset of channels in which signals were detected during the monitoring window, the subset of channels comprising one or more channels from the set of channels;
select, based at least in part on the subset of channels, a format for a first sub-codebook and a second sub-codebook, the second sub-codebook indicating a feedback state for corresponding data transmissions received on the one or more channels within the subset of channels;
configure a bitmap of a first uplink control message based at least in part on the first sub-codebook to identify the one or more channels within the subset of channels;
transmit the first uplink control message using the first sub-codebook, the first uplink control message identifying the format for the second sub-codebook and the bitmap identifying the one or more channels within the subset of channels; and
transmit a second uplink control message using the second sub-codebook according to the selected format, the second uplink control message comprising the feedback state for the corresponding data transmissions received on the one or more channels within the subset of channels during a transmission window.

24. The apparatus of claim 23, wherein the instructions are further executable by the processor to cause the apparatus to:
   determine, based at least in part on the monitoring, that the one or more channels in the subset of channels satisfy a channel quality metric, wherein the one or more channels in the subset of channels are identified based at least in part on the determining.

25. The apparatus of claim 23, wherein the instructions are further executable by the processor to cause the apparatus to:
   indicate, in the first uplink control message and for each channel of the one or more channels in the subset of channels, a starting point of a reporting occasion in which the second uplink control message will be transmitted.

26. The apparatus of claim 25, wherein the instructions are further executable by the processor to cause the apparatus to:
   indicate, in the first uplink control message and for each channel in the set of channels that is not included in the subset of channels, a NULL value as a starting point of a reporting occasion in which the second uplink control message will be transmitted.

27. The apparatus of claim 23, wherein:
   the first uplink control message is transmitted in a clear-to-send transmission occurring prior to a channel occupancy time; and
   one or more instances of the second uplink control message are transmitted in a physical uplink control channel transmission occurring within the channel occupancy time.

28. The apparatus of claim 27, wherein the instructions are further executable by the processor to cause the apparatus to:
   receive a confirmation signal confirming receipt of the first uplink control message, wherein the one or more instances of the second uplink control messages are transmitted based at least in part on the confirmation signal.

* * * * *